(12) United States Patent
Shoho et al.

(10) Patent No.: US 8,243,179 B2
(45) Date of Patent: Aug. 14, 2012

(54) SOLID-STATE IMAGE CAPTURING APPARATUS, DRIVING METHOD OF A SOLID-STATE IMAGE CAPTURING APPARATUS, AND ELECTRONIC INFORMATION DEVICE

(75) Inventors: Makoto Shoho, Osaka (JP); Kazuo Hashiguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 444 days.

(21) Appl. No.: 12/473,673

(22) Filed: May 28, 2009

(65) Prior Publication Data

US 2009/0295959 A1   Dec. 3, 2009

(30) Foreign Application Priority Data

May 29, 2008   (JP) .................... 2008-141709

(51) Int. Cl.
H04N 5/335   (2011.01)
(52) U.S. Cl. ......... 348/312; 348/311; 348/294; 348/308
(58) Field of Classification Search .................. 348/308, 348/294, 302, 312, 311
See application file for complete search history.

(56) References Cited

U.S. PATENT DOCUMENTS

2007/0097240 A1* 5/2007 Egawa et al. ................ 348/308
2008/0129851 A1* 6/2008 Kasuga et al. ............... 348/294

FOREIGN PATENT DOCUMENTS

| JP | 2000-516774 | 12/2000 |
|----|-------------|---------|
| JP | 2003-169259 | 6/2003 |
| JP | 2004-159274 | 6/2004 |
| JP | 2006-115547 | 4/2006 |
| JP | 2006-333035 | 12/2006 |
| JP | 2008-167004 | 7/2008 |
| WO | 97/17800    | 5/1997 |

* cited by examiner

*Primary Examiner* — Ricky Mack
*Assistant Examiner* — Zachary Wilkes
(74) *Attorney, Agent, or Firm* — Edwards Wildman Palmer LLP; David G. Conlin; Steven M. Jensen

(57) ABSTRACT

A solid-state image capturing apparatus according to the present invention includes a pixel area in which pixels for generating a signal charge by a photoelectric conversion on an incident light are arranged in a two dimensional matrix; a row selection section for selecting each pixel row of the pixel area; a plurality of column signal lines, to which an analog pixel signal from each pixel of a pixel row selected by the row selection section is readout; and a signal processing circuit for generating a digital pixel value from the analog pixel signal of each pixel that is read out to each of the column signal lines, where the signal processing circuit includes at least two or more AD conversion circuits for simultaneously converting the analog pixel signal of each pixel of the selected pixel row into a digital pixel value.

32 Claims, 20 Drawing Sheets

SOLID-STATE IMAGE CAPTURING APPARATUS, DRIVING METHOD OF A SOLID-STATE IMAGE CAPTURING APPARATUS, AND ELECTRONIC INFORMATION DEVICE

This nonprovisional application claims priority under 35 U.S.C. §119(a) to Patent Application No. 2008-141709 filed in Japan on May 29, 2008, the entire contents of which are hereby incorporated by reference.

BACKGROUND OF THE INVENTION

1. Field of the Invention

The present invention relates to a solid-state image capturing apparatus, a driving method of the solid-state image capturing apparatus, and an electronic information device, and in particular to a solid-state image capturing apparatus for performing a pixel row selecting operation to obtain an image signal with a wide dynamic range, using a short time exposure and a long time exposure, a driving method of the solid-state image capturing apparatus, and an electronic information device having the solid-state image capturing apparatus used therein.

2. Description of the Related Art

While CCD image sensors and CMOS image sensors are conventionally used for image capturing apparatuses, for outputting an image signal by capturing an image of a subject, CMOS image sensors are recently used more often for mobile devices and the like, from the perspective of electrical power saving, the CMOS image sensors consuming less power than CCD image sensors. In such image sensors, the exposure time is adjusted such that the level becomes appropriate for image signals obtained by capturing an image of a subject.

In a case where brightness is widely different depending on different parts of a subject, it is difficult to obtain, by the adjustment of exposure time, a captured image without deterioration of resolution between a low brightness portion and a high brightness portion of the subject. That is, the signals of the low brightness portion will be destroyed and the resolution of the low brightness portion will not be obtained if the exposure time is adjusted such that the signal level becomes fitting for a high brightness portion of the subject. At the same time, image signals which are read from an image capturing element also become weak, resulting in the poor S/N ratio. On the contrary, the signals of the high brightness portion will be saturated and the image of that portion will only be white in color thereby making it difficult to distinguish the subject, if the exposure time is adjusted such that the signal level becomes appropriate for a low brightness portion.

Therefore, Reference 1 discloses a way to obtain a captured image with a wide dynamic range in CMOS image sensors by performing both a long time exposure and a short time exposure, storing image data obtained by one of the exposures into a memory, reading the image data in the memory when the image data obtained by the other exposure is read out, and mixing both of the image data.

Further, Reference 2 discloses a way to obtain a captured image with a wide dynamic range in CMOS optical sensors, by dividing one frame period into three, and by using both image signals, the image signals with short accumulation time (photoelectric conversion time) which are obtained in one of two periods among the three periods, and the image signals with long accumulation time which are obtained in the other of the two periods. Hereinafter, Reference 2 will be briefly described.

FIG. 20 is a diagram illustrating the CMOS optical sensor disclosed in Reference 2 described above.

A CMOS optical sensor 10 includes: a pixel section 1 in which pixels are arranged in matrix; a vertical selection section 7 for selecting a pixel row in the pixel section 1; a first sample hold CDS section 10a for sample holding a reset signal and a data signal from each pixel in a selected pixel row to generate a difference signal; and a second sample hold CDS section 10b for sample holding a reset signal and a data signal from each pixel in the selected pixel row at a timing different from the CDS section 10a to generate a difference signal. The CMOS optical sensor 10 includes: a first horizontal selection section 12a for successively outputting the difference signal generated in the first sample hold CDS section 10a to a horizontal signal line 14a as, for example, a pixel signal with a long electric charge accumulation time (long time accumulation signal); and a second horizontal selection section 12b for successively outputting the difference signal generated in the second sample hold CDS section 10b to a horizontal signal line 14b as, for example, a pixel signal with a short electric charge accumulation time (short time accumulation signal). The CMOS optical sensor 10 includes: a first output section 16a for amplifying the long time accumulation signal, which is the difference signal outputted to the horizontal signal line 14a; a second output section 16b for amplifying the short time accumulation signal, which is the difference signal outputted to the horizontal signal line 14b; and a timing generator 6 for supplying a timing pulse to the vertical selection section 7, first and second horizontal selection sections 12a and 12b, and first and second sample hold CDS sections 10a and 10b. Furthermore, the pixel section 1 includes a vertical signal line provided (not shown) for reading a reset signal and a data signal from each of the pixels for each pixel column. The vertical signal line is supplied with a constant current by a constant current section 5.

In the CMOS optical sensor 10 with the configuration described above, the vertical selection section 7 and the first and second sample hold CDS section 10a and 10b are controlled by the timing pulse from the timing generator 6 such that two kinds of data signals having different accumulation times, or the long time accumulation signal and the short time accumulation signal, from each pixel row in the pixel section 1 are sample-held by corresponding sample hold CDS section 10a and 10b. Herein, for example, the long time accumulation signal of each pixel in a selected pixel row is supplied to the first sample hold CDS section 10a, and the short time accumulation signal of each pixel in the selected pixel row is supplied to the second sample hold CDS section 10b. As a result, the first and second sample hold CDS section 10a and 10b respectively maintain the long time accumulation signal and the short time accumulation signal for the same pixel.

The long time accumulation signal maintained in the first sample hold CDS section 10a is successively read out to the horizontal signal line 14a by the first horizontal selection section 12a and is supplied to the first output section 16a. In the first output section 16a, the long time accumulation signal is amplified and AD converted to be outputted as a digital pixel value having a long accumulation time. Similarly, the short time accumulation signal maintained in the second sample hold CDS section 10b is successively read out to the horizontal signal line 14b by the second horizontal selection section 12b and is supplied to the second output section 16b. In the second output section 16b, the short time accumulation signal is amplified and AD converted to be outputted as a digital pixel value having a short accumulation time.

By combining the digital pixel value having a long accumulation time and the digital pixel value having a short accumulation time, it becomes possible to obtain an image with a wide dynamic range.

Reference 1: Japanese Laid-Open Publication No. 2003-169259

Reference 2: Japanese Laid-Open Publication No. 2006-115547

SUMMARY OF THE INVENTION

The CMOS image sensor disclosed in Reference 1 described above has a problem with the chip size becoming large since a field memory is used to achieve the wide dynamic range in a captured image.

Further, in the CMOS optical sensor 10 disclosed in Reference 2, the digital pixel value obtained from a pixel column on one end side of the pixel section 1 described above has a length of the time to be maintained in the sample hold CDS circuit which is different from that of the digital pixel value obtained from a pixel column on the other end side of the pixel section 1. Due to this, a problem exists in which the picture quality of a dark image, in particular, is deteriorated by the influence of leak current and the like.

This problem occurs because the sample hold CDS circuit includes a switch transistor and a capacitor and therefore the amount of attenuation, in which the sample-held data signal is attenuated by the leak current in the transistor, varies depending on the length of the time for the sample holding.

The present invention is intended to solve the conventional problems described above. The objective of the present invention is to provide a solid-state image capturing apparatus, which avoids using a field memory that causes the increase in the chip size, and further avoids the influence of leak current to a data signal to be sample-held, while widening the dynamic range of a captured image; a driving method for the solid-state image capturing apparatus; and an electronic information device having the solid-state image capturing apparatus used therein.

A solid-state image capturing apparatus according to the present invention includes a pixel area in which pixels for generating a signal charge by a photoelectric conversion on an incident light are arranged in a two dimensional matrix; and a row selection section for selecting each pixel row of the pixel area, and successively outputting a pixel value of each pixel of a pixel row selected by the row selection section, the solid-state image capturing apparatus comprising: a plurality of column signal lines, to which an analog pixel signal from each pixel of a pixel row selected by the row selection section is readout, the column signal lines being provided for each pixel column in the pixel area; and a signal processing circuit for generating a digital pixel value from the analog pixel signal of each pixel that is read out to each of the column signal lines, wherein the signal processing circuit includes at least two or more AD conversion circuits for simultaneously converting the analog pixel signal of each pixel of the selected pixel row, which is read out to the plurality of column signal lines, into a digital pixel value, thereby achieving the objective described above.

Preferably, in a solid-state image capturing apparatus according to the present invention, each of the AD conversion circuits, which configures the signal processing circuit, includes a plurality of AD converters provided for each column signal line, for converting the analog pixel signal of each pixel of the selected pixel row, which is read out to each of the column signal lines, into a digital pixel value.

Still preferably, in a solid-state image capturing apparatus according to the present invention, the row selection section selects each pixel row three times or more within one frame; at a time of at least one selection of the pixel row among the three selections, a signal charge obtained by exposure is disposed from each pixel of the selected pixel row; at one of the other two selections of the pixel row among the three selections, a long time exposure analog pixel signal, which corresponds to a signal charge obtained by long time exposure in each pixel of the selected pixel row, is read out to a corresponding column signal line; and at the other one of the other two selections of the pixel row among the three selections, a short time exposure analog pixel signal, which corresponds to a signal charge obtained by short time exposure in each pixel of the selected pixel row, is read out to a corresponding column signal line.

Still preferably, in a solid-state image capturing apparatus according to the present invention, the row selection section sets timing for selecting each pixel row with one horizontal period as a unit.

Still preferably, in a solid-state image capturing apparatus according to the present invention, the row selection section sets timing for selecting each pixel row with one pixel period as a unit, the one pixel period being a period assigned to each pixel of each pixel row within one horizontal period.

Still preferably, in a solid-state image capturing apparatus according to the present invention, the row selection section selects each pixel row such that a long time exposure analog pixel signal, which corresponds to a signal charge obtained by long time exposure, and a short time exposure analog pixel signal, which corresponds to a signal charge obtained by short time exposure, are read out as the analog pixel signal from each pixel row to a column signal line corresponding to each pixel within one frame period; the signal processing circuit includes first and second AD conversion circuits as AD conversion circuits that includes the plurality of AD converters; the first AD converting circuit simultaneously AD converts a long time exposure analog pixel signal from each pixel of the selected pixel row into a long time exposure digital pixel value; and the second AD converting circuit simultaneously AD converts a short time exposure analog pixel signal from each pixel of the selected pixel row into a short time exposure digital pixel value.

Still preferably, in a solid-state image capturing apparatus according to the present invention, the long time exposure analog pixel signal is substantially an analog pixel signal obtained from a signal charge accumulated in the pixel during one frame period; and the short time exposure analog pixel signal is substantially an analog pixel signal obtained from a signal charge accumulated in the pixel during one horizontal period.

Still preferably, in a solid-state image capturing apparatus according to the present invention, the row selection section selects each pixel row such that, in a horizontal period corresponding to each pixel row, the long time exposure analog pixel signal is read out from each pixel of one pixel row to a corresponding column signal line within a first horizontal blanking period, and the short time exposure analog pixel signal is read out from each pixel of other pixel row adjacent to the one pixel row, to a corresponding column signal line within a second horizontal blanking period subsequent to the first horizontal blanking period.

Still preferably, in a solid-state image capturing apparatus according to the present invention, the first AD conversion circuit performs an AD conversion on the long time exposure analog pixel signal, which is read out to the column signal line within the first horizontal blanking period, within a remaining signal processing period subsequent to the second horizontal blanking period within the horizontal period corresponding to each pixel row; and the second AD conversion circuit performs an AD conversion on the short time exposure analog pixel signal, which is read out to the column signal line within the second horizontal blanking period, within the remaining signal processing period in parallel with the AD conversion on the long time exposure analog pixel signal in the first AD conversion circuit.

Still preferably, in a solid-state image capturing apparatus according to the present invention, the row selection section selects each pixel row three times within a period that corresponds to one frame; at the time of a first pixel row selection, a signal charge, which is obtained by exposure, of each pixel of the selected pixel row is disposed of; at the time of a second pixel row selection, a signal charge, which is obtained by exposure in each pixel of the selected pixel row during a period from the time of the first pixel row selection till the time of the second pixel row selection, is read out to a corresponding column signal line; at the time of a third pixel row selection, a signal charge, which is obtained by exposure in each pixel of the selected pixel row during a period from the time of the second pixel row selection till the time of the third pixel row selection, is read out to a corresponding column signal line.

Still preferably, in a solid-state image capturing apparatus according to the present invention, a period from the time of the first pixel row selection till the time of the second pixel row selection is longer than a period from the time of the second pixel row selection till the time of the third pixel row selection; at the time of the second pixel row selection, the long time exposure analog pixel signal, which corresponds to a signal charge obtained by long time exposure in each pixel of the selected pixel row, is read out to a corresponding column signal line; and at the time of the third pixel row selection, the short time exposure analog pixel signal, which corresponds to a signal charge obtained by short time exposure in each pixel of the selected pixel row, is read out to a corresponding column signal line.

Still preferably, in a solid-state image capturing apparatus according to the present invention, the control section includes an exposure time control section for adjusting the time of the first pixel row selection based on an average value within a predetermined period of the long time exposure digital pixel value to perform feedback control on the long time exposure time.

Still preferably, in a solid-state image capturing apparatus according to the present invention, the time of the first pixel row selection till the time of the second pixel row selection is shorter than the time of the second pixel row selection till the time of the third pixel row selection; at the time of the second pixel row selection, the short time exposure analog pixel signal, which corresponds to a signal charge obtained by short time exposure in each pixel of the selected pixel row, is read out to a corresponding column signal line; at the time of the third pixel row selection, the long time exposure analog pixel signal, which corresponds to a signal charge obtained by long time exposure in each pixel of the selected pixel row, is read out to a corresponding column signal line.

Still preferably, in a solid-state image capturing apparatus according to the present invention, the control section includes an exposure time control section for adjusting timing of the first pixel row selection based on an average value within a predetermined period of the short time exposure digital pixel value to perform feedback control on the short time exposure time.

Still preferably, in a solid-state image capturing apparatus according to the present invention, the row selection section selects each pixel row three times within a period that corresponds to one frame; at the time of the first pixel row selection, a signal charge, which is obtained by exposure in each pixel of the selected pixel row during a period from the time of a preceding third pixel row selection till the time of the first pixel row selection, is read out to a corresponding column signal line; at the time of the second pixel row selection, a signal charge, which is obtained by exposure, of each pixel of the selected pixel row is disposed of; and at the time of the third pixel row selection, a signal charge, which is obtained by exposure in each pixel of the selected pixel row during a period from the time of the second pixel row selection till the time of the third pixel row selection, is read out to a corresponding column signal line.

Still preferably, in a solid-state image capturing apparatus according to the present invention, the period from the second pixel row selection till the time of the third pixel row selection is shorter than the period from the third pixel row selection till the time of a next first pixel row selection; at the time of the first pixel row selection, the long time exposure analog pixel signal, which corresponds to a signal charge obtained by long time exposure in each pixel of the selected pixel row, is read out to a corresponding column signal line; and at the time of the third pixel row selection, the short time exposure analog pixel signal, which corresponds to a signal charge obtained by short time exposure in each pixel of the selected pixel row, is read out to a corresponding column signal line.

Still preferably, in a solid-state image capturing apparatus according to the present invention, the control section includes an exposure time control section for adjusting the time of the second pixel row selection based on an average value within a predetermined period of the long time exposure digital pixel value to perform feedback control on the short time exposure time.

Still preferably, in a solid-state image capturing apparatus according to the present invention, the row selection section selects each pixel row four times within a period that corresponds to one frame; at the time of the first pixel row selection, a signal charge, which is obtained by exposure, of each pixel of the selected pixel row is disposed of; at the time of the second pixel row selection, a signal charge, which is obtained by exposure in each pixel of the selected pixel row during a period from the time of the first pixel row selection till the time of the second pixel row selection, is read out to a corresponding column signal line; at the time of the third pixel row selection, a signal charge, which is obtained by exposure, of each pixel of the selected pixel row is disposed of; and at the time of the fourth pixel row selection, a signal charge, which is obtained by exposure in each pixel of the selected pixel row during a period from the time of the third pixel row selection till the time of the fourth pixel row selection, is read out to a corresponding column signal line.

Still preferably, in a solid-state image capturing apparatus according to the present invention, the control section includes an exposure time control section for adjusting the time of the first pixel row selection based on an average value within a predetermined period of the long time exposure digital pixel value to perform feedback control on the long time exposure time as well as for adjusting the time of the third pixel row selection based on an average value within a predetermined period of the short time exposure digital pixel value to perform feedback control on the short time exposure time.

Still preferably, in a solid-state image capturing apparatus according to the present invention, the first AD conversion circuit includes a first CDS circuit provided prior to each AD converter of the first AD conversion circuit, for sampling a reset signal read out to the column signal line as an analog pixel signal obtained at a dark time, and a data signal output to the column signal line as a long time exposure analog pixel signal to output a first difference analog pixel signal of the reset signal and the data signal; and the second AD conversion circuit includes a second CDS circuit provided prior to each AD converter of the second AD conversion circuit, for sampling a reset signal read out to the column signal line as an analog pixel signal obtained at a dark time, and a data signal output to the column signal line as a short time exposure analog pixel signal to output a second difference analog pixel signal of the reset signal and the data signal.

Still preferably, in a solid-state image capturing apparatus according to the present invention, each AD converter constituting the first AD conversion circuit includes: a first comparator for comparing the first difference analog pixel signal of a constant level outputted from the first CDS circuit prior to the AD converter, with a first ramp waveform signal to output a first timing signal when the signal level of the first ramp waveform signal exceeds the signal level of the first difference analog pixel signal; and a first latch circuit for latching a first count value, which corresponds to the signal level of the first difference analog pixel signal, when the first timing signal is outputted, and wherein each AD converter constituting the second AD conversion circuit includes: a second comparator for comparing the second difference analog pixel signal of a constant level outputted from the second CDS circuit prior to the AD converter, with a second ramp waveform signal to output a second timing signal when the signal level of the second ramp waveform signal exceeds the signal level of the second difference analog pixel signal; and a second latch circuit for latching a second count value, which corresponds to the signal level of the second difference analog pixel signal, when the second timing signal is outputted.

Still preferably, in a solid-state image capturing apparatus according to the present invention, the signal processing circuit includes: a first horizontal shift register for outputting a timing pulse signal to the first AD conversion circuit such that the long time exposure digital pixel value of each pixel is successively outputted, the long time exposure digital pixel value being obtained in an AD converter corresponding to each column signal line of the first AD conversion circuit; and a second horizontal shift register for outputting a timing pulse signal to the second AD conversion circuit such that the short time exposure digital pixel value of each pixel is successively outputted, the short time exposure digital pixel value being obtained in an AD converter corresponding to each column signal line of the second AD conversion circuit, wherein the first latch circuit includes: a first initial stage latch section for latching the first count value, which corresponds to the signal level of the first difference analog pixel signal, as the long time exposure digital pixel value based on the first timing signal from the first comparator; and a first subsequent stage latch section for maintaining the latch output of the first initial stage latch section and outputting the latch output of the first initial stage latch section by a timing pulse from the first horizontal shift register, wherein the second latch circuit includes: a second initial stage latch section for latching the second count value, which corresponds to the signal level of the second difference analog pixel signal, as the short time exposure digital pixel value based on the second timing signal from the second comparator; and a second subsequent stage latch section for maintaining the latch output of the second initial stage latch section and outputting the latch output of the second initial stage latch section by a timing pulse from the second horizontal shift register.

Still preferably, in a solid-state image capturing apparatus according to the present invention, a process in which the first AD conversion circuit performs an AD conversion on the first difference analog pixel signal is the same as a process in which the second AD conversion circuit performs an AD conversion on the second difference analog pixel signal.

Still preferably, in a solid-state image capturing apparatus according to the present invention, the signal processing circuit includes a control section for controlling the first and second AD conversion circuits, and the control section includes: a first ramp waveform generating section for outputting the first ramp waveform signal to a plurality of AD converters provided for each column signal line of the first AD conversion circuit; a second ramp waveform generating section for outputting the second ramp waveform signal to a plurality of AD converters provided for each column signal line of the second AD conversion circuit; and a counter circuit for supplying the count value to the plurality of AD converters.

Still preferably, in a solid-state image capturing apparatus according to the present invention, a process in which the first AD conversion circuit performs an AD conversion on the first difference analog pixel signal is different from a process in which the second AD conversion circuit performs an AD conversion on the second difference analog pixel signal.

Still preferably, in a solid-state image capturing apparatus according to the present invention, the signal processing circuit includes a control section for controlling the first and second AD conversion circuits, and the control section includes: a first ramp waveform generating section for outputting the first ramp waveform signal to a plurality of AD converters provided for each column signal line of the first AD conversion circuit; a second ramp waveform generating section for outputting the second ramp waveform signal to a plurality of AD converters provided for each column signal line of the second AD conversion circuit, the second ramp waveform signal having a smaller maximum amplitude value compared to the first ramp waveform signal; and a counter circuit for supplying the count value to the plurality of AD converters.

Still preferably, in a solid-state image capturing apparatus according to the present invention, the signal processing circuit includes a control section for controlling the first and second AD conversion circuits, and the control section includes: a first ramp waveform generating section for outputting the first ramp waveform signal having a fixed waveform to a plurality of AD converters provided for each column signal line of the first AD conversion circuit; a second ramp waveform generating section for outputting the second ramp waveform signal having a variable waveform to a plurality of AD converters provided for each column signal line of the second AD conversion circuit; and a counter circuit for supplying the count value to the plurality of AD converters, and in the second AD conversion circuit, a dynamic range of an AD conversion in each of the AD converters is adjusted by a waveform of the second ramp waveform signal.

Still preferably, in a solid-state image capturing apparatus according to the present invention, the control section includes a ramp waveform setting section for setting a maximum amplitude value of a ramp waveform generated in the second ramp waveform generating section based on a setting signal from the outside.

Still preferably, in a solid-state image capturing apparatus according to the present invention, the control section includes a ramp waveform control section for performing feedback control on a maximum amplitude value of a ramp waveform generated in the second ramp waveform generating section based on an average value within a predetermined period of the short time exposure digital pixel value.

Still preferably, in a solid-state image capturing apparatus according to the present invention, the signal processing circuit includes a control section for controlling the first and second AD conversion circuits, and the control section includes: a first ramp waveform generating section for outputting the first ramp waveform signal having a variable waveform to a plurality of AD converters provided for each column signal line of the first AD conversion circuit; a first counter circuit for supplying a first counter value to the plurality of AD converters of the first AD conversion circuit; a first ramp waveform control section for performing feedback control on a maximum amplitude value of a ramp waveform generated in the first ramp waveform generating section based on an average value within a predetermined period of the long time exposure digital pixel value; a second ramp waveform generating section for outputting the second ramp waveform signal having a variable waveform to a plurality of AD converters provided for each column signal line of the second AD conversion circuit; a second counter circuit for supplying a second counter value to the plurality of AD converters of the second AD conversion circuit; and a second ramp waveform control section for performing feedback control on a maximum amplitude value of a ramp waveform generated in the second ramp waveform generating section based on an average value within a predetermined period of the short time exposure digital pixel value, and in the first AD conversion circuit, a dynamic range of an AD conversion in each of the AD converters is adjusted by a waveform of the first ramp waveform signal, and in the second AD conversion circuit, a dynamic range of an AD conversion in each of the AD converters is adjusted by a waveform of the second ramp waveform signal.

Still preferably, in a solid-state image capturing apparatus according to the present invention, the signal processing circuit includes: a first horizontal shift register for outputting a timing pulse signal to the first AD conversion circuit such that the long time exposure digital pixel value of each pixel is successively outputted, the long time exposure digital pixel value being obtained in an AD converter corresponding to each column signal line of the first AD conversion circuit; and a second horizontal shift register for outputting a timing pulse signal to the second AD conversion circuit such that the short time exposure digital pixel value of each pixel is successively outputted, the short time exposure digital pixel value being obtained in an AD converter corresponding to each column signal line of the second AD conversion circuit.

Still preferably, in a solid-state image capturing apparatus according to the present invention, the signal processing circuit includes a logic circuit for combining, for each corresponding pixel, the long time exposure digital pixel value of each pixel, which is successively outputted from the first AD conversion circuit, and the short time exposure digital pixel value of each pixel, which is successively outputted from the second AD conversion circuit.

Still preferably, in a solid-state image capturing apparatus according to the present invention, the signal processing circuit includes a control section for controlling the first AD conversion circuit such that the long time exposure analog pixel signal of each pixel of the selected pixel row is simultaneously converted into a long time exposure digital pixel value as well as for controlling the second AD conversion circuit such that the short time exposure analog pixel signal of each pixel of the selected pixel row is simultaneously converted into a short time exposure digital pixel value.

In a method for driving a solid-state image capturing apparatus according to the present invention, the solid-state image capturing apparatus includes: a pixel area in which pixels for generating a signal charge by a photoelectric conversion on an incident light are arranged in a two dimensional matrix; a row selection section for selecting each pixel row of the pixel area; and a plurality of column signal lines, to which an analog pixel signal from each pixel of a pixel row selected by the row selection section is readout; and the column signal lines being provided for each pixel column in the pixel area, in the method, the solid-state image capturing apparatus is driven such that a pixel row is successively selected by the row selection section and a pixel value of each pixel of the selected pixel row is successively outputted, and in the method, the each pixel row is selected twice or more within one frame period by the row selection section, and wherein an analog signal of each pixel, which is read out from each pixel of the selected pixel row to a corresponding column signal line, is simultaneously converted into a digital pixel value, thereby achieving the objective described above.

Preferably, in a method for driving a solid-state image capturing apparatus according to the present invention, each pixel row is selected twice within one frame period by the row selection section such that a long time exposure analog pixel signal, which corresponds to a signal charge obtained by long time exposure, and a short time exposure analog pixel signal, which corresponds to a signal charge obtained by short time exposure, are read out as the analog pixel signal from each pixel row to a column signal line corresponding to each pixel; the long time exposure analog pixel signal from each pixel of a selected pixel row is simultaneously AD converted into a long time exposure digital pixel value by a first AD conversion circuit that includes a plurality of AD converters provided for the each column signal line; and the short time exposure analog pixel signal from each pixel of a selected pixel row is simultaneously AD converted into a short time exposure digital pixel value by a second AD conversion circuit that includes a plurality of AD converters provided for each column signal line, thereby achieving the objective described above.

An electronic information device according to the present invention has an image capturing section for capturing an image of a subject, wherein the image capturing section is the solid-state image capturing apparatus according to the present invention, thereby achieving the objective described above.

The functions of the present invention will be described hereinafter.

According to the present invention, a solid-state image capturing apparatus includes a pixel area in which pixels are arranged in two dimensional matrix, and each pixel generates a signal charge by photoelectric conversion of incident light; and a row selection section for selecting each pixel row of the pixel area, and the solid-state image capturing apparatus further includes at least two AD conversion circuits for simultaneously converting an analog pixel signal of each pixel of a selected pixel row, which is read out to a column signal line of each pixel column, into a digital pixel value. Thus, it becomes possible to perform an AD conversion on analog pixel signals of respective pixels simultaneously by different AD conversion circuits, the analog pixel signals having different accumulation times and being read out from the same pixel row. That is, the time in which the analog pixel signal of each pixel of the selected pixel row is read out to the column signal line and the AD conversion is performed on it, and in particular the time in which the analog pixel signal is sample-held (prior to being sent to the AD conversion circuit), becomes the same for all the pixel columns. Thus, it becomes possible to prevent the amounts of attenuation of the analog pixel signals, which are read out to respective column signal lines, from being largely different between one end side and the other end side of the column signal line due to the influence of leak current during that time.

As a result, it becomes possible to avoid using a field memory that causes the increase in the chip size, and avoid the influence of leak current to a data signal (analog pixel signal) to be sample-held, while widening the dynamic range of a captured image.

Furthermore, according to the present invention, first and second conversion circuits are provided, the first conversion circuit simultaneously AD converting a long time exposure analog pixel signal from each pixel of a selected pixel row into a long time exposure digital pixel value, and the second conversion circuit simultaneously AD converting a short time exposure analog pixel signal from each pixel of the selected pixel row into a short time exposure digital pixel value. As a result, it becomes possible to simultaneously perform AD conversion on the long time exposure analog pixel signal and the short time exposure analog pixel signal of each pixel, the signals being read out from the same pixel row, by the first and second AD conversion circuits, respectively.

That is to say, that the time during which the analog pixel signal is read out to the column signal line and is AD converted, becomes the same for all the pixel columns for both the long time exposure analog pixel signal and the short time exposure analog pixel signal of each pixel of the selected pixel row, thereby preventing the amounts of attenuation of the analog pixel signals (which are read out to respective column signal lines) from being largely different between one end side and the other end side of the column signal line due to the influence of leak current during that time. As a result, the long time exposure digital pixel value of each pixel successively outputted from the first AD conversion circuit and the short time exposure digital pixel value of each pixel successively outputted from the second AD conversion circuit are combined for each corresponding pixel, so that it becomes possible to avoid using a field memory that causes the increase in the chip size, and avoid the influence of leak current to a data signal to be sample-held, while widening the dynamic range of a captured image.

Furthermore, according to the present invention, the row selection section selects each of the pixel rows three times or more during one frame. During the three times of the selection, at the time of at least one selection of the pixel row, a signal charge obtained by exposure is disposed from each pixel of the selected pixel row. At one of the other two selections of the pixel row, the long time exposure analog pixel signal, which corresponds to the signal charge obtained by long time exposure from each pixel of the selected pixel row, is read out to a corresponding column signal line. At the other one of the other two selections of the pixel row, the short time exposure analog pixel signal, which corresponds to the signal charge obtained by short time exposure from each pixel of the selected pixel row, is read out to a corresponding column signal line. Therefore, the length of the long time exposure or the short time exposure can be adjusted by changing the timing for selecting the pixel row at which the signal charge of each pixel of the selected pixel row is disposed. Furthermore, compared to the case where the timing for selecting a pixel row is set with units of one horizontal period, it becomes possible to make fine adjustments to the exposure time by setting the timing for selecting each of the pixel rows with units of one pixel period, which is a period assigned to each pixel of each pixel row. Furthermore, it becomes possible to continually adjust the time for the long time exposure or short time exposure to an appropriate exposure time in accordance with the level of the brightness of a subject by performing feedback controlling on the timing for selecting the pixel row at which the signal charge of each pixel of the selected pixel row is disposed, based on the average value of a predetermined period of time of the long time exposure digital pixel value or the short time exposure digital pixel value.

Furthermore, according to the present invention, the row selection section selects each of the pixel rows four times during a period of time that corresponds to one frame. At the time of the selection of the first pixel row, a signal charge obtained by exposure is disposed from each pixel of the selected pixel row. At the time of the selection of the second pixel row, a signal charge obtained by exposure from each pixel of the selected pixel row from the time for the selection of the first pixel row till the time for the selection of the second pixel row, is read out to a corresponding column signal line. At the time of the selection of the third pixel row, a signal charge obtained by exposure is disposed from each pixel of the selected pixel row. At the time of the selection of the fourth pixel row, a signal charge obtained by exposure from each pixel of the selected pixel row from the time for the selection of the third pixel row till the time for the selection of the fourth pixel row, is read out to a corresponding column signal line. Therefore, the length of both the long time exposure and the short time exposure can be adjusted by changing the timing for selecting the pixel row (at the time of the selection of the first and third pixel rows) at which the signal charge of each pixel of the selected pixel row is disposed. Furthermore, it becomes possible to continually adjust the time for the long time exposure and short time exposure to an appropriate exposure time in accordance with the level of the brightness of a subject by performing feedback controlling on the timing for selecting the pixel row (at the time of the selection of the first and third pixel rows) at which the signal charge of each pixel of the selected pixel row is disposed, based on the average value within a predetermined period of time of the long time exposure digital pixel value and the short time exposure digital pixel value.

Furthermore, according to the present invention, the first and second AD conversion circuits both include a CDS circuit for sampling a reset signal read out to the column signal line as an analog pixel signal obtained at a dark time and a data signal outputted to the column signal line as a long time exposure analog pixel signal or a short time exposure analog pixel signal to output their difference analog pixel signal, the CDS circuit being provided prior to respective AD converters in the first and second AD converters. Therefore, it becomes possible to make the digital pixel value obtained by the AD conversion on the difference analog pixel signal free of reset noise.

Furthermore, according to the present invention, since the process in which the first conversion circuit performs AD conversion on the first difference analog pixel signal is defined to be a different process from the process in which the second conversion circuit performs AD conversion on the second difference analog pixel signal, it becomes possible, for example, to change the dynamic range of the AD conversion between the AD conversion on the long time exposure analog pixel signal and the AD conversion on the short time exposure analog pixel signal. As a result, it will be unnecessary to include an amplifying circuit and the like for adjusting the gain of the analog pixel signal prior to the AD conversion.

Furthermore, according to the present invention, since the control section for controlling the first and second AD conversion circuits includes a ramp waveform setting section for setting the maximum amplitude value of a ramp waveform used for the AD conversion of the short time exposure analog pixel signal based on a setting signal from the outside, it becomes possible to set an appropriate dynamic range for the AD conversion with respect to the short time exposure analog pixel signal having a small analog signal level.

Furthermore, according to the present invention, since the control section for controlling the first and second AD conversion circuits includes a ramp waveform control section for performing feedback control on the maximum amplitude value of a ramp waveform used for the AD conversion based on an average value within a predetermined period of the short time exposure digital pixel value, it becomes possible to set an appropriate dynamic range for the AD conversion in accordance with the brightness level of a subject with respect to the short time exposure analog pixel signal having a small analog signal level.

Furthermore, according to the present invention, since the control section for controlling the first and second AD conversion circuits includes a ramp waveform control section for performing feedback control on the maximum amplitude value of a ramp waveform used for the AD conversion based on an average value within a predetermined period of the long time exposure digital pixel value, and a ramp waveform control section for performing feedback control on the maximum amplitude value of a ramp waveform used for the AD conversion based on an average value within a predetermined period of the short time exposure digital pixel value, it becomes possible to set an appropriate dynamic range for the AD conversion in accordance with the brightness level of a subject with respect to not only the short time exposure analog pixel signal having a small analog signal level, but also the long time exposure analog pixel signal having a large analog signal level.

Furthermore, according to the present invention, since the control section for controlling the first and second AD conversion circuits includes a lamp waveform control section for performing feedback control on the maximum amplitude value of a lamp waveform used for the AD conversion based on an average value within a predetermined period of the long time exposure digital pixel value, and a lamp waveform control section for performing feedback control on the maximum amplitude value of a lamp waveform used for the AD conversion based on an average value within a predetermined period of the short time exposure digital pixel value, it becomes possible to set an appropriate dynamic range for the AD conversion in accordance with the brightness level of a subject with respect to not only the short time exposure analog pixel signal having a small analog signal level, but also the long time exposure analog pixel signal having a large analog signal level.

According to the present invention with the structure described above, a solid-state image capturing apparatus includes: a pixel area in which pixels for generating a signal charge by a photoelectric conversion on an incident light are arranged in two dimensional matrix; and a row selection section for selecting each pixel row of the pixel area, the solid-state image capturing apparatus successively outputting a pixel value of each pixel of a pixel row selected by the row selection section. The solid-state image capturing apparatus further includes a plurality of column signal lines, to which an analog pixel signal from each pixel of the pixel row selected by the row selection section is read out, the column signal lines being provided for each pixel column in the pixel area, and a signal processing circuit for generating a digital pixel value from the analog pixel signal of each pixel that is read out to each of the column signal lines. Further, the signal processing circuit includes at least two or more AD conversion circuits for simultaneously converting the analog pixel signal of each pixel of the selected pixel row that is read out to each of the plurality of column signal lines into a digital pixel value. Thus, it becomes possible to read out a long time exposure analog pixel signal, which corresponds to a signal charge obtained by long time exposure, and a short time exposure analog pixel signal, which corresponds to a signal charge obtained by short time exposure, to a column signal line that corresponds to each pixel to simultaneously AD converts the long time exposure analog pixel signal and the short time exposure analog pixel signal into respective digital pixel values. As a result, the digital pixel values of the long time exposure analog pixel signal and the short time exposure analog pixel signal are combined, thereby enabling to avoid using a field memory that causes the increase in the chip size, and avoid the influence of leak current to a data signal to be sample-held, while widening the dynamic range of a captured image.

These and other advantages of the present invention will become apparent to those skilled in the art upon reading and understanding the following detailed description with reference to the accompanying figures.

Figure 1:
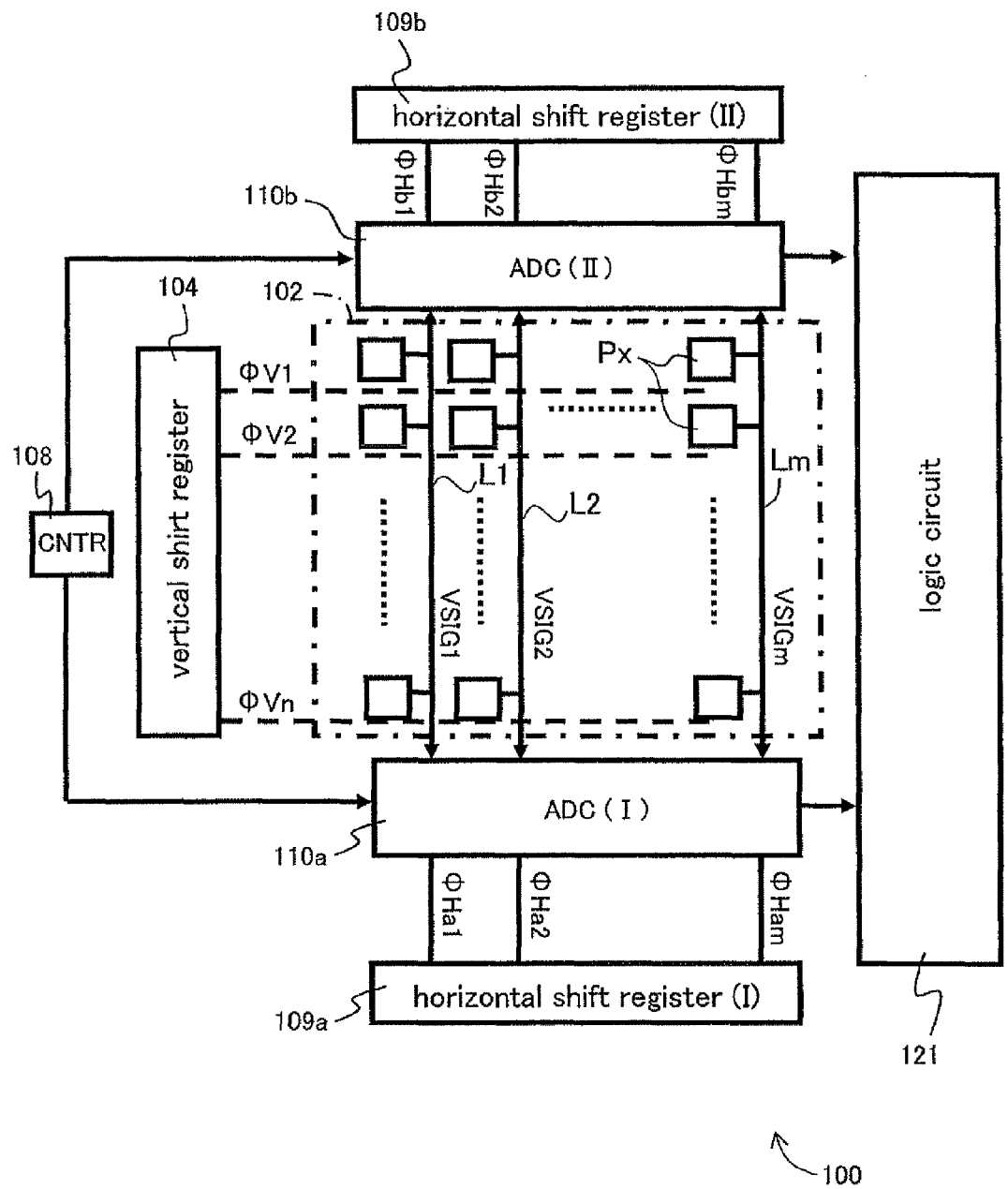
FIG. 1 is a block diagram illustrating a configuration of a solid-state image capturing apparatus according to Embodiment 1 of the present invention and a method for driving the solid-state image capturing apparatus.

90 electronic information device
91 solid-state image capturing apparatus
92 memory section
93 display section
94 communication section
95 image output section
100, 100*a*, 100*b*, 100*c*, 100*d* solid-state image capturing apparatus
102 pixel area
104, 104*b*, 104*d* vertical shift register
108, 108*a*, 108*c*, 108*d* control section
109*a* first horizontal shift register
109*b* second horizontal shift register
110*a* first AD conversion circuit
110*b* second AD conversion circuit
111 CDS circuit
112 comparator
113 n bit latch section
113*a* initial stage n bit latch
113*b* subsequent stage n bit latch
115 n bit counter
116 ramp waveform generating section
117*c* exposure time control section
120 AD converter
121 logic circuit
L1 to Lm column signal line
Ra to Rc selection row

DESCRIPTION OF THE PREFERRED EMBODIMENTS

Hereinafter, embodiments of the present invention will be described with reference to the accompanying figures.

(Embodiment 1)

Figure 2:
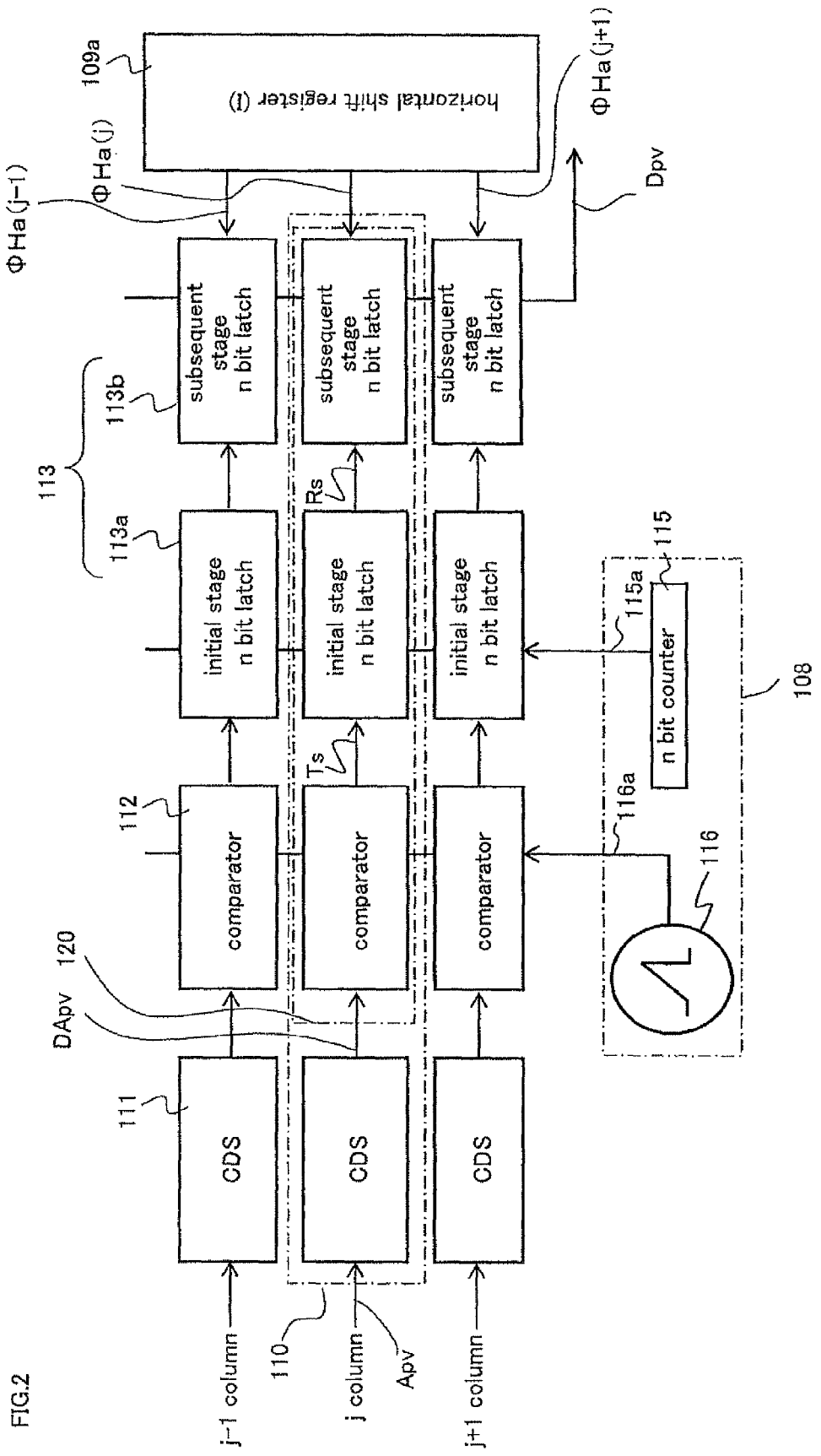
FIG. 2 is a block diagram describing an AD conversion circuit in the solid-state image capturing apparatus according to Embodiment 1.
Figure 3:
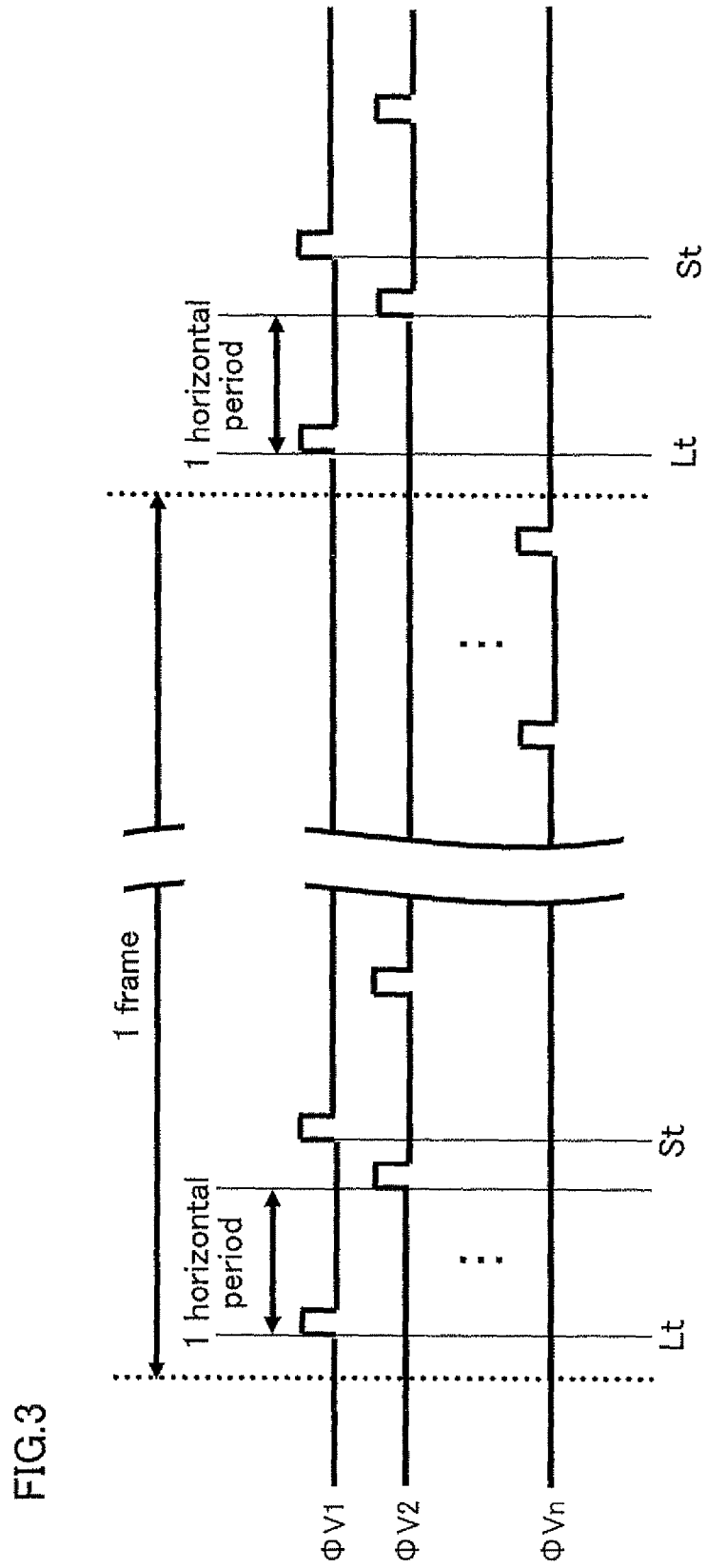
FIG. 3 is a waveform diagram describing an operation of the solid-state image capturing apparatus according to Embodiment 1, illustrating timing of occurrence of row selection pulses within one frame period.
Figure 4:
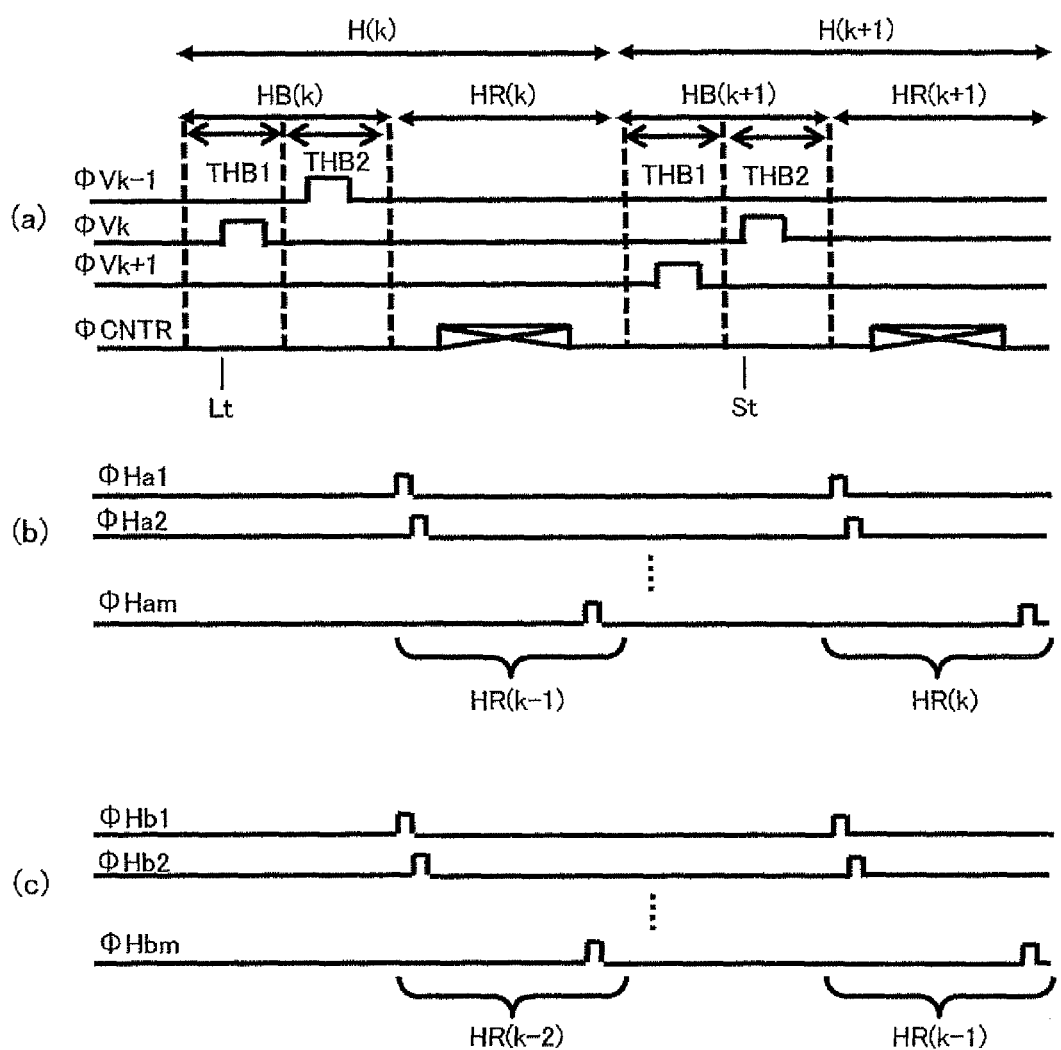
FIG. 4 is a waveform diagram describing an operation of the solid-state image capturing apparatus according to Embodiment 1, where FIG. 4(*a*) illustrates timing of occurrence of row selection pulses within one horizontal period, and FIGS. 4(*b*) and 4(*c*) illustrate timing of occurrence of column selection pulses outputted from first and second horizontal shift registers respectively.
Figure 5:
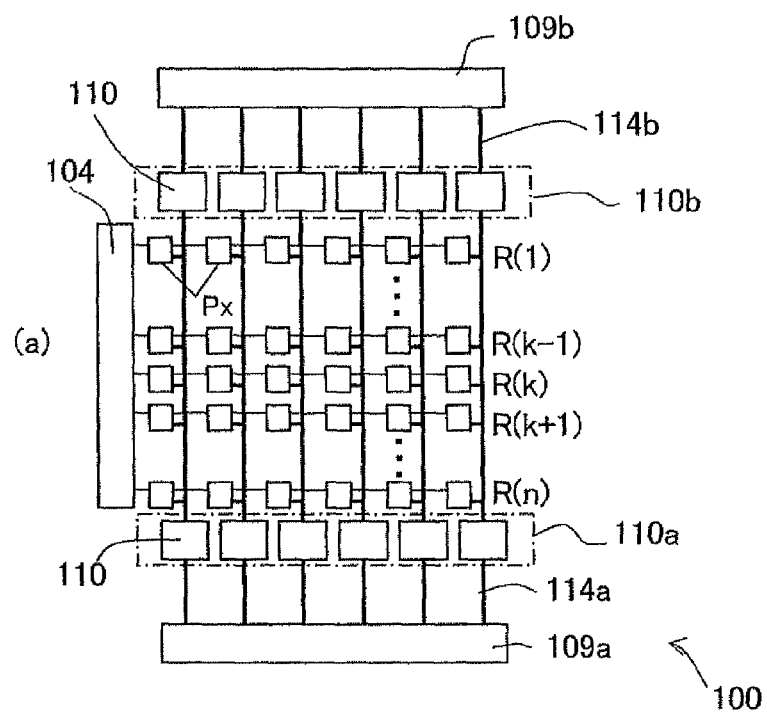
FIG. 5 is a diagram describing an operation of the solid-state image capturing apparatus according to Embodiment 1, illustrating timing of long time exposure and short time exposure within one frame period (FIG. 5(*b*)) together with a configuration of an essential part of the solid-state image capturing apparatus (FIG. 5(*a*)).
Figure 5:
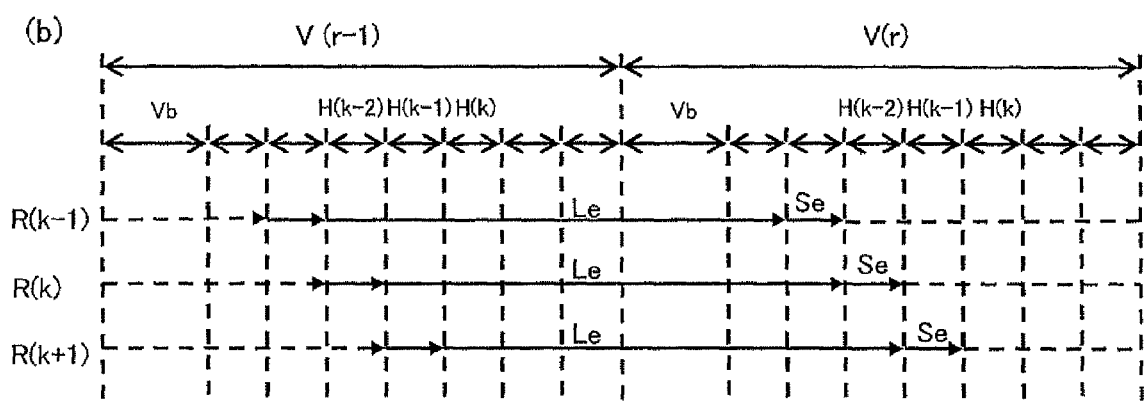
Figure 6:
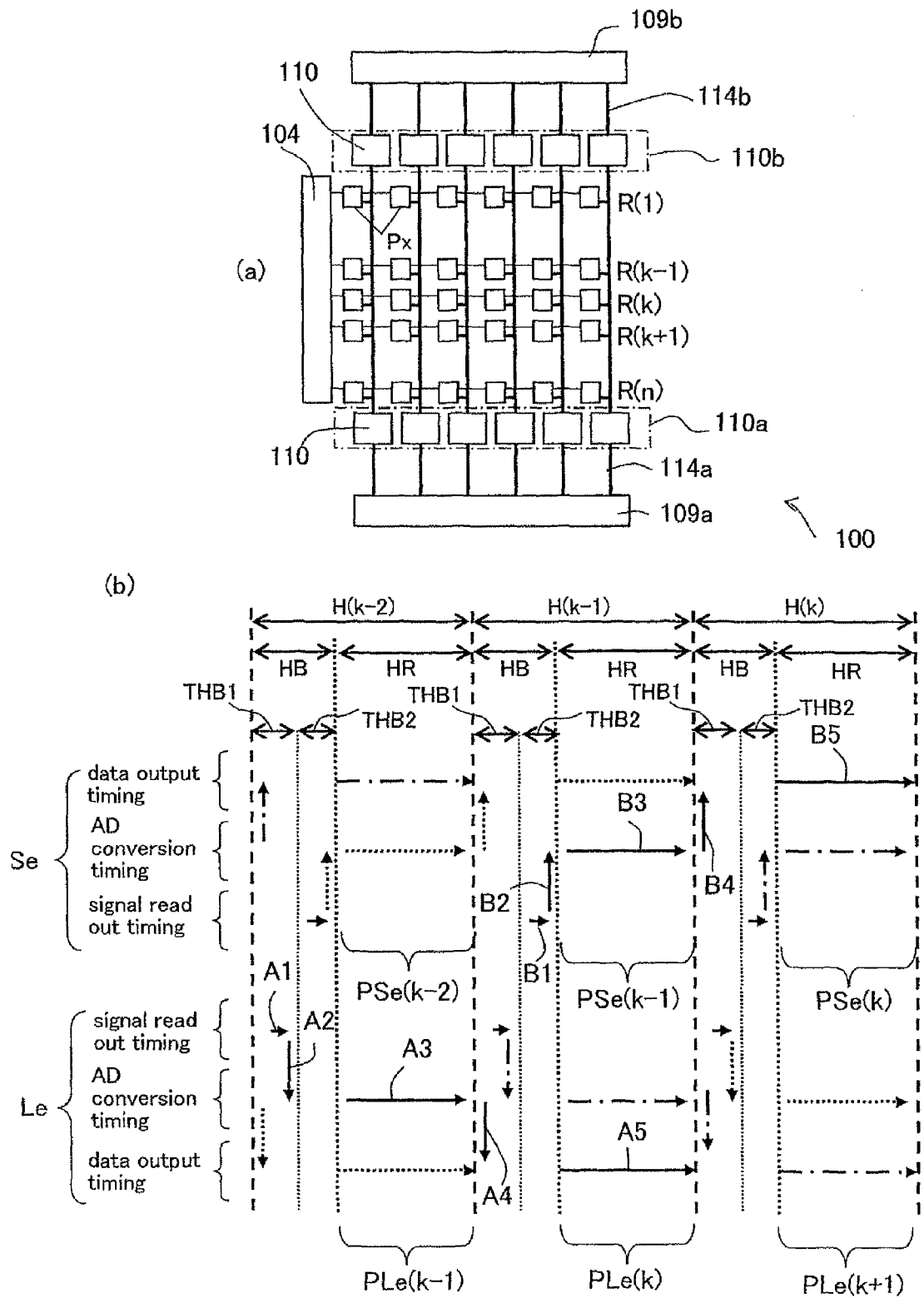
FIG. 6 is a diagram describing an operation of the solid-state image capturing apparatus according to Embodiment 1, illustrating signal processing in successive three horizontal periods (FIG. 6(*b*)) together with a configuration of an essential part of the solid-state image capturing apparatus (FIG. 6(*a*)).

FIGS. 1 to 6 are diagrams describing a solid-state image capturing apparatus according to Embodiment 1 of the present invention and a driving method of the solid-state image capturing apparatus. FIG. 1 is a block diagram illustrating the configuration of the solid-state image capturing apparatus according to Embodiment 1. FIG. 2 is a block diagram describing an AD conversion circuit in the solid-state image capturing apparatus. FIGS. 3 and 4 are each a waveform diagram describing an operation of the solid-state image capturing apparatus according to Embodiment 1. FIG. 3 illustrates timing of occurrence of row selection pulses within one frame period. FIG. 4(*a*) illustrates timing of occurrence of row selection pulses within one horizontal period. FIGS. 4(*b*) and 4(*c*) respectively illustrate timing of occurrence of column selection pulses that are outputted from first and second horizontal shift registers. FIG. 5 is a diagram illustrating timing of long time exposure and short time exposure within one frame period (FIG. 5(*b*)) together with a configuration of an essential part of the solid-state image capturing apparatus (FIG. 5(*a*)) FIG. 6 is a diagram illustrating signal processing in successive three horizontal periods (FIG. 6(*b*)) together with a configuration of an essential part of the solid-state image capturing apparatus (FIG. 6(*a*)).

A solid-state image capturing apparatus 100 according to Embodiment 1 includes: a pixel area 102 in which pixels are arranged in two dimensional matrix (n row×m column), the pixels generating a signal charge by a photoelectric conversion on an incident light; and a vertical shift register (row selection section) 104 for selecting each pixel row in the pixel area by selection pulses ΦV1 to ΦVn. Pixel values of pixels in the selected pixel row are successively outputted by the vertical shift register 104.

Furthermore, the solid-state image capturing apparatus 100 includes: a plurality of column signal lines L1 to Lm provided for each pixel column in the pixel area, to which an analog pixel signal from each pixel of a pixel row selected by the vertical shift register 104 is read out; and a signal processing circuit for generating a digital pixel value from the analog pixel signal of each pixel read out to each of the column signal lines.

Herein, the vertical shift register 104 performs a pixel read out operation (i.e., selection of a pixel row) twice in one frame period. Specifically, the vertical shift register 104 selects each pixel row such that a long time exposure analog pixel signal, which corresponds to a signal charge obtained by long time exposure, and a short time exposure analog pixel signal, which corresponds to a signal charge obtained by short time exposure, are read out as the analog pixel signal from each pixel row to a column signal line that corresponds to each pixel, within one frame. The long time exposure analog pixel signal is substantially an analog pixel signal that is obtained from a signal charge accumulated in the pixel during one frame period, and the short time exposure analog pixel signal is substantially an analog pixel signal that is obtained from a signal charge accumulated in the pixel during one horizontal frame period. Herein, the long time exposure time and the short time exposure time are set with one horizontal period as a unit; however, the setting of these exposure times may be one pixel period, which is a period assigned to each pixel of each pixel row in one horizontal period.

The signal processing circuit described above includes: a first AD conversion circuit (ADC (I)) 110a for simultaneously AD converting a long time exposure analog pixel signal from each pixel of a selected pixel row into a long time exposure digital signal; and a second AD conversion circuit (ADC(II)) 110b for simultaneously AD converting a short time exposure analog pixel signal from each pixel of a selected pixel row into a short time exposure digital signal. The first AD conversion circuit 110a and the second AD conversion circuit 110b include a plurality of AD converters 120 (see FIG. 2) provided for each column signal line, for converting an analog pixel signal of a pixel of a selected pixel row, which is read out to each column signal line, into a digital pixel value.

The signal processing circuit described above includes a control section 108. The control section 108 controls the first AD conversion circuit 110a such that the longtime exposure analog pixel signals from each pixel of the selected pixel row are simultaneously converted into long time exposure digital pixel values, and controls the second AD conversion circuit 10b such that the short time exposure analog pixel signals from each pixel of the selected pixel row are simultaneously converted into short time exposure digital pixel values.

Furthermore, the signal processing circuit described above includes a horizontal shift register (I) (first horizontal register) 109a for outputting timing pulse signals ΦHa1 to ΦHam to the first AD conversion circuit 110a so that the long time exposure digital pixel values of each pixel, which are obtained by each AD converter of the first AD conversion circuit 110a described above, are successively outputted; and a horizontal shift register (II) (second horizontal register) 109b for outputting timing pulse signals ΦHb1 to ΦHbm to the second AD conversion circuit 110b so that the short time exposure digital pixel values of each pixel, which are obtained by each AD converter of the second AD conversion circuit 110b described above, are successively outputted.

Furthermore, the signal processing circuit described above includes a logic circuit 121 for combining, for each corresponding pixel, the long time exposure digital pixel values of each pixel, which are outputted from the first AD conversion circuit 110a, and the short time exposure digital pixel values of each pixel, which are outputted from the second AD conversion circuit 110b.

Figure 20:
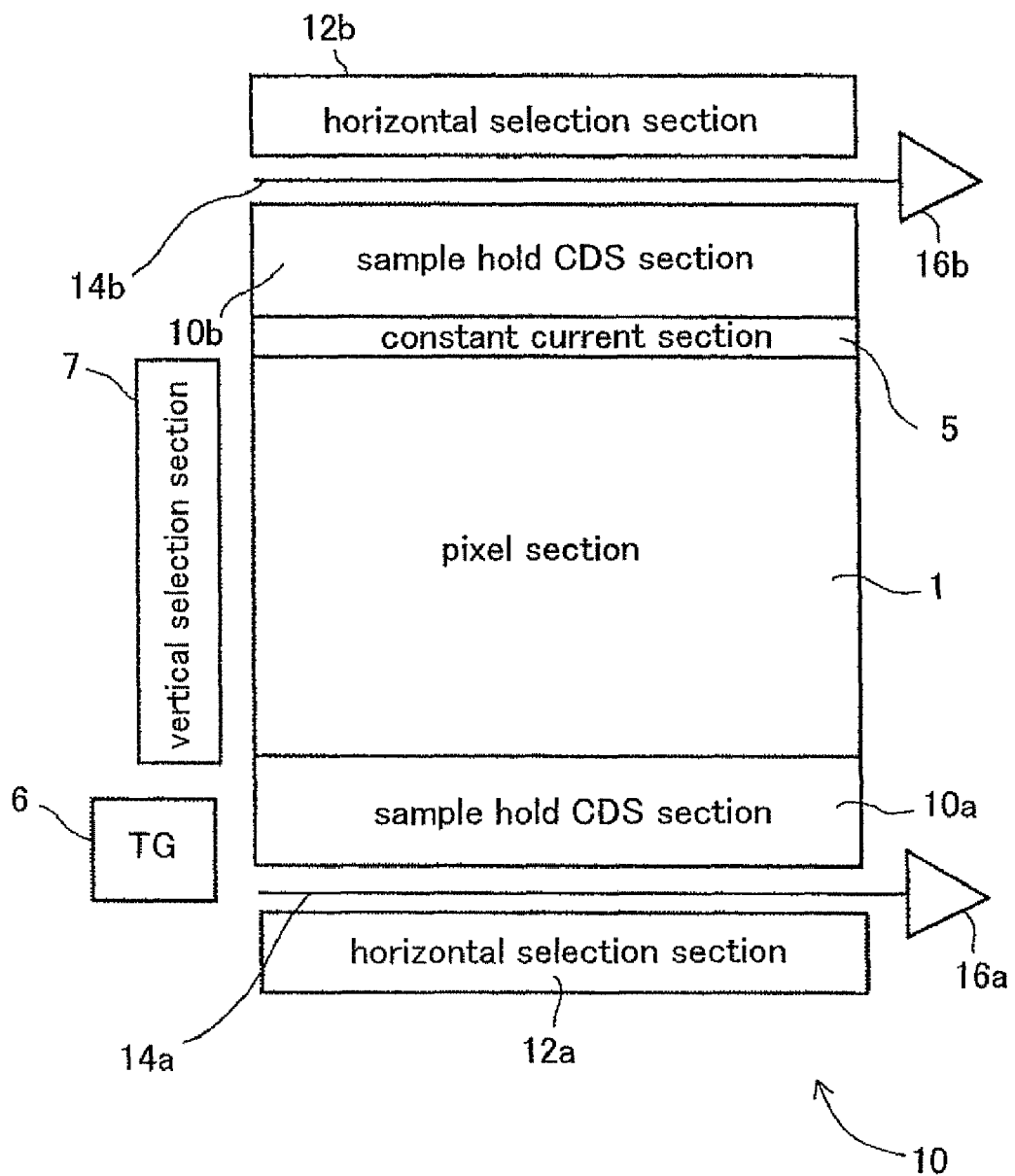
FIG. 20 is a diagram illustrating a CMOS optical sensor disclosed in Reference 2 as a conventional solid-state image capturing apparatus.

Note that, although not shown in FIG. 1, the solid-state image capturing apparatus according to Embodiment 1 also includes a constant current source for supplying a constant current to a column signal line, as similar to the conventional solid-state image capturing apparatus illustrated in FIG. 20.

Hereinafter, the first and second AD conversion circuits 110a and 110b will be described in detail. Herein the first AD conversion circuit 110a described above is for, for example, AD converting the long time exposure analog pixel signal within a remaining signal processing period HR(k), which is a period following a second horizontal blanking period THB2 in a horizontal period H(k) that corresponds to each pixel row, the long time exposure analog pixel signals being read out to a column signal line within a first horizontal blanking period THB1 in one horizontal period H(k) that corresponds to each pixel row. The second AD conversion circuit 110b is for AD converting the short time exposure analog pixel signals within the remaining signal processing period HR(k) in parallel to the AD conversion of the long time exposure analog pixel signals by the first AD conversion circuit, the short time exposure analog pixel signals being read out to the column signal line within a second horizontal blanking period THB2 in one horizontal period H(k) that corresponds to each pixel row.

The first AD conversion circuit 110a described above includes, as illustrated in FIG. 2, a CDS circuit 111 provided prior to the AD converters 120 for sampling a reset signal read out to a column signal line as an analog pixel signal obtained at a dark time and a data signal outputted to the column signal line as a long time exposure analog signal to output their first difference analog pixel signal. Similarly, the second AD conversion circuit 110b described above includes a CDS circuit 111 provided prior to the AD converters 120 (see FIG. 2) for sampling a reset signal read out to a column signal line as an analog pixel signal obtained at a dark time and a data signal outputted to the column signal line as a short time exposure analog signal to output their second difference analog pixel signal. Herein, the CDS circuits 111 and corresponding AD converters 120 connected to the outputs thereof configure a signal processing section 110 that corresponds to each column.

As illustrated in FIG. 2, each of the AD converters 120, which configures the first AD conversion circuit described above, includes: a comparator (first comparator) 112; and an n bit latch circuit (first latch circuit) 113. As illustrated in FIG. 2, the comparator 112 compares a constant level of a difference analog pixel signal (first difference analog pixel signal) DApv, which is outputted from the CDS circuit (first CDS circuit) 111 in the preceding configuration, with a ramp waveform signal (first ramp waveform) 116a and outputs a timing signal (first timing signal) Ts when the signal level of the ramp waveform signal exceeds the signal level of the difference analog pixel signal DApv. Further, the n bit latch circuit 113 latches, when the timing signal is outputted, a count value (first count value), which corresponds to the signal level of the difference analog pixel signal, to output it as a digital pixel value Dpv. The n bit latch circuit 113 of the first AD conversion circuit 110a includes: an initial stage n bit latch (first initial stage latch section) 113a; and a subsequent stage n bit latch (first subsequent stage latch section) 113b. The initial stage n bit latch 113a latches a first count value that corresponds to a signal level of a first difference analog pixel signal based on a first timing signal Ts from the first comparator 112, as the long time exposure digital pixel value. The subsequent stage n bit latch 113b maintains the latch output of the first initial stage latch section and then outputs, by the timing pulse ΦHa(j) from the first horizontal shift register 109a, the latch output of the first stage latch section by column selection. Furthermore, the subsequent stage n bit latch 113b, which corresponds to each column, of the signal processing section 110 configures a circuit that successively shifts the latch output (digital pixel value) of the initial stage n bit latch 113a by column selection and then outputs it as the long time exposure digital pixel value from the subsequent stage n bit latch 113b that corresponds to a column on the end of one side.

Similarly, each of the AD converters 120, which configures the second AD conversion circuit 110b described above, includes: a comparator (second comparator) 112; and an n bit latch circuit (second latch circuit) 113. The comparator 112 compares a constant level of a difference analog pixel signal (second difference analog pixel signal) DApv, which is outputted from the CDS circuit (second CDS circuit) 111 in the preceding configuration, with a ramp waveform signal (second ramp waveform signal) 116a and outputs a timing signal (second timing signal) Ts when the signal level of the ramp waveform signal exceeds the signal level of the difference analog pixel signal DApv. Further, the n bit latch circuit 113 latches, when the timing signal is outputted, a count value (second count value) of n bits, which corresponds to the signal level of the difference analog pixel signal, to output it as a digital pixel value Dpv. The n bit latch circuit 113 of n bits of the second AD conversion circuit 110b also has the same configuration as the first AD conversion circuit 110a. That is, the n bit latch circuit 113 includes: an initial stage n bit latch (second initial stage latch section) 113a; and a subsequent stage n bit latch (second subsequent stage latch section) 113b. The initial stage n bit latch 113a latches a second count value that corresponds to a signal level of a second difference analog pixel signal based on a second timing signal Ts from the second comparator 112, as the short time exposure digital pixel value. The subsequent stage n bit latch 113b maintains the latch output of the second initial stage latch section and then outputs, by the timing pulse ΦHb(j) from the second horizontal shift register 109b, the latch output of the second stage latch section by column selection. Furthermore, the subsequent stage n bit latch 113b, which corresponds to each column, of the signal processing section 110 configures a circuit that successively shifts the latch output (digital pixel value) of the initial stage n bit latch 113a by column selection and then outputs it as the short time exposure digital pixel value from the subsequent stage n bit latch 113b that corresponds to a column on the end of one side.

Herein, the process in which the first AD conversion circuit 110a performs the AD conversion on the first difference analog pixel signal (long time exposure analog pixel signal) and the process in which the second AD conversion circuit 110b performs the AD conversion on the second difference analog pixel signal (long time exposure analog pixel signal) are made the same process. That is, the control section 108, which controls the first and second AD conversion circuits 110a and 110b described above, includes: a ramp waveform generating section 116 for outputting the ramp waveform signal 116a described above to the plurality of AD converters provided for each column signal line; and an n bit counter (counter circuit) 115 for supplying an n bit count value 115a to the plurality of AD converters.

The ramp waveform generating section 116 in the control section 108 described above is for supplying the same ramp waveform signal to each of the AD converters in the first AD conversion circuit and each of the AD converters in the second AD conversion circuit; however, the ramp waveform signal supplied to each AD converter of the first AD conversion circuit and the ramp waveform signal supplied to each AD converter of the second AD conversion circuit may have a different waveform from each other. However, in such a case, the control section 108 is required to include: a first ramp waveform generating section for supplying a first ramp waveform signal to each of the AD converters in the first AD conversion circuit; and a second ramp waveform generating section for supplying a second ramp waveform signal, which is different from the first ramp waveform signal, to each of the AD converters in the second AD conversion circuit.

Next, the operation will be described.

In the following description, a case will be described where pixel signals of two kinds of accumulation time (exposure time) of one frame period and one horizontal period are read out. FIG. 3 illustrates selection pulses ΦV1 to ΦVn of the first to the n-th pixel rows in the pixel area 102 as selection pulses of a pixel row. In particular, FIG. 3 illustrates timing for the first pixel row as read out timing Lt of the long time exposure analog pixel signal and read out timing St of the short time exposure analog pixel signal. Further, FIG. 4 illustrates selection pulses ΦVk−1, ΦVk, and ΦVk+1 of the (k−1)th, kth and (k+1)th pixel rows in the pixel area 102 as selection pulses of a pixel row. In particular, FIG. 4 illustrates timing for the kth pixel row as read out timing Lt of the long time exposure analog pixel signal and read out timing St of the short time exposure analog pixel signal.

In the solid-state image capturing apparatus 100 with the configuration described above, when the vertical shift register 104 outputs the selection signals (selection pulses) ΦV1 to ΦVn, each pixel row R(k) is selected in the pixel area 102 (see FIG. 5(a)). That is, pixels (hereinafter, also referred to as pixel cells) are successively selected for each horizontal line.

Simultaneously, each pixel row R(k) (k=1~n) is selected by the timing Lt and timing St such that the long time exposure analog pixel signal and the short time exposure analog pixel signal are outputted to the column signal lines L1 to Lm, as illustrated in FIG. 3. The time during which a pixel row is selected at the timing St till a pixel row is selected at the timing Lt is substantially one frame period; and the signal charge accumulated during this period in a pixel cell is read out to a column signal line as a long time exposure analog pixel signal. Furthermore, the time during which a pixel row is selected at the timing Lt till a pixel row is selected at the timing St is substantially one horizontal period; and the signal charge accumulated during this period in a pixel cell is read out to a column signal line as a short time exposure analog pixel signal.

It is necessary to perform the readout of the long time exposure analog pixel signal and the short time exposure analog pixel signal so as not to overlap between adjacent pixel rows. Herein, as illustrated in FIG. 4 (a), analog pixel signals VSIG1 to VSIGm, whose accumulation time substantially corresponds to one frame, are outputted from a pixel cell in a k-th row during a first horizontal blanking period THB1 of one horizontal period H(k) in one frame to the vertical signal lines (column signal lines) L1 to Lm and are sampled and held by the first AD conversion circuit (ADC(I)) 110a.

Next, analog pixel signals VSIG1 to VSIGm, whose accumulation time substantially corresponds to one horizontal period H, are outputted from a pixel cell in a (k−1)th row during a second horizontal blanking period THB2 of one horizontal period H(k) to the vertical signal lines L1 to Lm and are sampled and held by the second AD conversion circuit (ADC(II)) 110b.

The long time exposure analog pixel signal of the k-th pixel row and the short time exposure analog pixel signal of the (k−1)th pixel row, which are read out during the first horizontal blanking period THB1 of the horizontal period H(k) and during the second horizontal blanking period THB2 of the horizontal period H(k) respectively, are AD converted by the first and second AD conversion circuits 110a and 110b respectively, in the remaining signal processing period HR(k) of the horizontal period H(k), as illustrated in FIG. 4(a).

For example, in the first AD conversion circuit 110a, a reset signal read out from each pixel of each column as an analog pixel signal DApv obtained at a dark time and a data signal read out from each pixel of each column as a long time exposure analog signal, are sampled in the CDS circuit 111, and the difference analog pixel signal of them is outputted from the CDS circuit 111. Then, in the comparator 112, the analog pixel signal DApv is compared with the ramp waveform signal 116a from the ramp waveform generating section 116, and a timing signal Ts is outputted to the n bit latch circuit 113 when the signal level of the ramp waveform exceeds the signal level of the difference analog pixel signal DApv. In the n bit latch circuit 113, the count output 115a outputted from the n bit counter 115 is latched by the initial stage n bit latch 113a at timing signal Ts, and the latch output of the initial stage n bit latch 113a is maintained by the subsequent stage n bit latch circuit 113b as the long time exposure digital pixel value described above.

This kind of AD conversion of the long time exposure analog pixel signals of each pixel of the selected pixel row are performed by both the AD converter 120 corresponding to each column and the CDS circuit 111 in the former stage in the first AD conversion circuit 110a simultaneously.

Furthermore, the AD conversion of the short time exposure analog pixel signals are performed in the second AD conversion circuit 110b in a similar manner as the AD conversion of the long time exposure analog pixel signals.

Then, in a signal processing period HR(k+1) of the next horizontal period H(k+1), the long time exposure digital pixel values of the k-th pixel row are successively outputted from the first AD conversion circuit 110a to a logic circuit (logic section) 121 for each pixel by the pulse signals ΦHa1 to ΦHam from the first horizontal shift register 109a. Simultaneously, the short time exposure digital pixel values of the (k−1)th pixel row are successively outputted from the second AD conversion circuit 110b to the logic circuit 121 for each pixel by the pulse signals ΦHb1 to ΦHbm from the second horizontal shift register 109b.

For example, in the logic section 121, when the digital pixel values obtained by the AD conversion during the signal processing period of the horizontal period H(k−1), the digital pixel values outputted from the first AD conversion circuit 110a, are delayed for one horizontal period using a line memory, a digital signal (short time exposure digital pixel value) from the pixel cell of the (k−1)th row of one horizontal period H accumulation time and a digital signal (long time exposure digital pixel value) from the pixel cell of the (k−1)th row of 1 frame accumulation time can be obtained. By appropriately connecting them, a captured image having a wider dynamic range can be obtained compared to a conventional solid-state image capturing element.

Hereinafter, the operation for reading out the long time exposure analog pixel signals and the short time exposure analog pixel signals are read out from the pixels of each pixel row described above to obtain respective long time exposure digital pixel values and the short time exposure digital pixel values, with reference to adjacent three pixel rows R(k−1), R(k), and R(K+1) in the pixel area.

FIG. 5(b) is a diagram describing an electric charge accumulation time in adjacent three pixel rows, schematically illustrating a period Le, in which electric charges obtained by photoelectric conversions in the pixels of each pixel row are accumulated for a long period of time, and a period Se, in which electric charges obtained by photoelectric conversions in the pixels of each pixel row are accumulated for a short period of time. FIG. 5(a) illustrates the position of the three pixel rows of FIG. 5(b) in the pixel area.

As can be understood from FIG. 5(b), the long time exposure at each of the pixels in each pixel row is performed for a substantially one frame period extending from frame V(r−1) to frame V(r). In a pixel row R(k), for example, the long time exposure is performed during a period Le, which extends from a (k−1)th horizontal period H(k−1) of the frame V(r−1) till a (k−2)th horizontal period H(k−2) of the next frame V(r). The short time exposure is performed during a period Se, which is a (k−2)th horizontal period H(k−2) of the frame V(r).

Furthermore, in pixel rows R(k−1) and R(k+1) before and after the pixel row R(k), the long time exposure and short time exposure described above are each performed at timing that is shifted by one horizontal period compared to the exposure in the pixel row R(k). In addition, in FIG. 5(b), the period Vb is a vertical blanking period, during which no analog signal is read out from any pixel row.

From the pixels of each pixel row, the read out (signal reading out timing) of the long time exposure analog pixel signal to the vertical signal line (column signal line), the AD conversion (AD conversion timing) of the read out long time exposure analog pixel signal, and the output (data output timing) of the long time exposure digital pixel value obtained by the AD conversion are successively performed by row by shifting their timing by one horizontal period with respect to the adjacent three pixel rows. Similarly, the read out (signal reading out timing) of the short time exposure analog pixel signal to the vertical signal line (column signal line), the AD conversion (AD conversion timing) of the read out short time exposure analog pixel signal, and the output (data output timing) of the short time exposure digital pixel value obtained by the AD conversion are successively performed by row by shifting one horizontal period from the operation of the long time exposure described above.

Hereinafter, such timing will be described with respect to FIG. 6.

In FIG. 6(b), with respect to the k-th pixel row R(k) in the pixel area, the flow of the process of the long time exposure analog pixel signal is illustrated by arrows A1 to A5, and the flow of the process of the short time exposure analog pixel signal is illustrated by arrows B1 to B5.

The read out of the long time exposure analog pixel signal of the pixel row R(k) to the vertical signal line is performed during the horizontal blanking period THB1 of the horizontal period H(k−2), as illustrated by the arrow A1, and the signal is outputted to the first AD conversion circuit as illustrated by the arrow A2. Subsequently, the AD conversion of the read out long time exposure analog pixel signal is performed during a signal processing period PLe(k−1) (that is, a data output period of the long time exposure analog pixel signal of the pixel row R(k−1)) after the horizontal blanking period THB2 of the horizontal period H(k−2), as illustrated by the arrow A3. The long time exposure digital pixel value obtained by this AD conversion is latched by the initial stage n bit latch 113a of each column of the AD conversion circuit 110a, as illustrated by the arrow A4, and the latch output is maintained, as the long time exposure digital pixel value, at the subsequent stage n bit latch 113b of each column. Subsequently, as illustrated by the arrow A5, the maintained long time exposure digital pixel value is shifted by column selection in the subsequent stage n bit latch of each column of the first AD conversion circuit 110a, by a timing pulse 114a (ΦHaj (j=1 to m)) from the horizontal shift register 109a during a signal processing period (that is, data output period of the long time exposure analog pixel signal of the pixel row R(k)) PLe(k) after the horizontal blanking period THB2 of the horizontal period H(k−1); and is outputted from the first AD conversion circuit 110a to the logic circuit 120. In the process of the pixel signal obtained by the long time exposure Le, the arrow of a chain line indicates a process of the pixel row R(k+1) one row after the pixel row R(k), and the arrow of a dotted line indicates a process of the pixel row R(k−1) one row prior to the pixel row R(k).

Further, the read out of the short time exposure analog pixel signal of the pixel row R(k) to the vertical signal line is performed during the horizontal blanking period THB2 of the horizontal period H (k−1) as illustrated by the arrow B1, and the signal is outputted to the second AD conversion circuit, as indicated by the arrow B2. Subsequently, the AD conversion of the read out short time exposure analog pixel signal is performed during a signal processing period (that is, the data output period of the short time exposure analog pixel signal of the pixel row R(k−1)) PSe (k−1) after the horizontal blanking period THB2 of the horizontal period H(k−1), as indicated by the arrow B3. The short time exposure digital pixel value obtained by this AD conversion is latched by the initial stage latch 113a of each column of the AD conversion circuit 110b, and the latch output is maintained as the short time exposure digital pixel value at the subsequent stage n bit latch 113b of each column, as indicated by the arrow B4. Subsequently, as illustrated by the arrow B5, the maintained short time exposure digital pixel value is shifted by column selection in the subsequent stage n bit latch 113b of each column of the second AD conversion circuit 110b, by a timing pulse 114b (ΦHbj (j=1 to m)) from the horizontal shift register 109b during a signal processing period (that is, data output period of the short time exposure analog pixel signal of the pixel row R(k)) PSe(k) after the horizontal blanking period THB2 of the horizontal period H(k); and is outputted from the second AD conversion circuit 110b to the logic circuit 120. In the process of the pixel signal obtained by the short time exposure Se, the arrow of a chain line indicates a process of the pixel row R(k+1) one row after the pixel row R(k), and the arrow of a dotted line indicates a process of the pixel row R(k−1) one row prior to the pixel row R(k).

According to Embodiment 1 as described above, the solid-state image capturing apparatus, which performs the pixel signal read out operation to obtain an image signal having a wide dynamic range by the short time exposure and the long-time exposure, includes the first AD conversion circuit 110a, which simultaneously AD converts the long time exposure analog pixel signals from each pixel of the selected pixel row into the long time exposure digital pixel values, and the second AD conversion circuit 110b, which simultaneously AD converts the short time exposure analog pixel signals from each pixel of the selected pixel row into the short time exposure digital pixel values. In the solid-state image capturing apparatus, the long time exposure digital pixel values of each pixel successively outputted from the first AD conversion circuit and the short time exposure digital pixel values of each pixel successively outputted from the second AD conversion circuit are combined for each corresponding pixel. Therefore, it becomes possible to avoid using a field memory that causes the increase in the chip size, and avoid the influence of leak current to a data signal to be sample-held, while widening the dynamic range of a captured image.

Furthermore, the first and second AD conversion circuits each include a CDS circuit provided in the initial stage of each of the AD converters, CDS circuit sampling both the reset signal read out to the column signal line as an analog pixel signal obtained at a dark time and a data signal outputted to the column signal line as the long time or short time exposure analog pixel signal to output the difference analog pixel signal therebetween. Therefore, it becomes possible to make the digital pixel value, obtained by the AD conversion on the difference analog pixel signal, be free of reset noise.

In Embodiment 1, the long time exposure period is defined as one frame period and the short time exposure period is defined as one horizontal H period; however, any time can be selected as such accumulation times (exposure times) with two different kinds of length.

In Embodiment 1 described above, two kinds of accumulation times with different lengths are set for each pixel; however, three kinds of accumulation times with different lengths may be set for each pixel. In such a case, it is necessary that another AD conversion circuit is provided in addition to the first and second AD conversion circuits indicated in Embodiment 1, and AD conversion process corresponding to each analog pixel signal with a different accumulation time is performed individually.

Further, in Embodiment 1 described above, in the solid-state image capturing apparatus described above, the process in which the first AD conversion circuit AD converts the first difference analog pixel signal and the process in which the second AD conversion circuit AD converts the second difference analog pixel signal are the same AD conversion process; however, they may be different AD conversion processes.

For example, the AD conversion of the long time exposure analog pixel signal and the AD conversion of the short time exposure analog pixel signal may be performed using ramp waveforms having different maximum amplitude values.

In such a case, in the solid-state image capturing apparatus of Embodiment 1, the control section 108 described above is defined to include: a first ramp waveform generating section for outputting the first ramp waveform signal to the plurality of AD converters of the first AD conversion circuit 110a; a second ramp waveform generating section for outputting the second ramp waveform signal to the plurality of AD converters of the second AD conversion circuit, the second ramp waveform signal having a smaller maximum amplitude value than the first ramp waveform signal; and a counter circuit for supplying a count signal to the plurality of AD converters.

As described above, the process in which the first AD conversion circuit AD converts the first difference analog pixel signal is defined to be a different process from the process in which the second AD conversion circuit AD converts the second difference analog pixel signal, so that it becomes possible, for example, to vary the dynamic range of the AD conversion between the AD conversion of the long time exposure analog pixel signal and the AD conversion of the short time exposure analog pixel signal. As a result, it will be unnecessary to include an amplifying circuit and the like for adjusting the gain of the analog pixel signal prior to the AD conversion.

Furthermore, it is also possible to make the maximum amplitude of the second ramp waveform signal variable.

In this case, in the solid-state image capturing apparatus of Embodiment 1, for example, it is defined that the control section 108 includes: a first ramp waveform generating section for outputting a first ramp waveform signal with a fixed waveform to the plurality of AD converters of the first AD conversion circuit; a second ramp waveform generating section for outputting a second ramp waveform signal with a variable waveform to the plurality of AD converters of the second AD conversion circuit; and a counter circuit for supplying a count signal to the plurality of AD converters, and it is defined, in the second AD conversion circuit, that the dynamic range of the AD conversion at each of the AD converters is adjusted by the waveform of the second ramp waveform signal.

Furthermore, the control section 108 may include a ramp waveform setting section for setting the maximum amplitude value of a ramp waveform generated by the second ramp waveform generation section based on a setting signal from the outside.

In this case, since the second AD conversion circuit includes a ramp waveform setting section for setting the maximum amplitude value of a ramp waveform used for the AD conversion of the short time exposure analog pixel signal based on a setting signal from the outside, it becomes possible to set an appropriate dynamic range of the AD conversion for a short time exposure analog pixel signal having a small analog signal level.

In addition, the control section 108 may include a ramp waveform control section for performing feedback control of the maximum amplitude value of the ramp waveform generated by the second ramp waveform generating section based on the average of the short time exposure digital pixel signal during a predetermined period. Furthermore, the control section 108 may include a ramp waveform control section for performing feedback control as described above on the maximum amplitude value of the ramp waveform supplied to the first and second AD conversion circuits respectively based on the average value within a predetermined period of the long time exposure digital pixel value and the short time exposure digital pixel value.

Since the control section includes the ramp waveform control section for performing feedback control on the maximum amplitude value of the ramp waveform used for the AD conversion based on the average value within a predetermined period of the long time exposure digital pixel value and the short time exposure digital pixel value, it becomes possible to set an appropriate dynamic range of the AD conversion in accordance with the brightness level of a subject with respect to the short time exposure analog pixel signal having a small analog signal level and further with respect to the long time exposure analog pixel signal.

(Embodiment 2)

Hereinafter, a specific description will be given with regard to a solid-state image capturing apparatus according to Embodiment 2 for performing feedback control on the maximum amplitude value of a ramp waveform supplied to the first and second AD conversion circuits described above.

Figure 7:
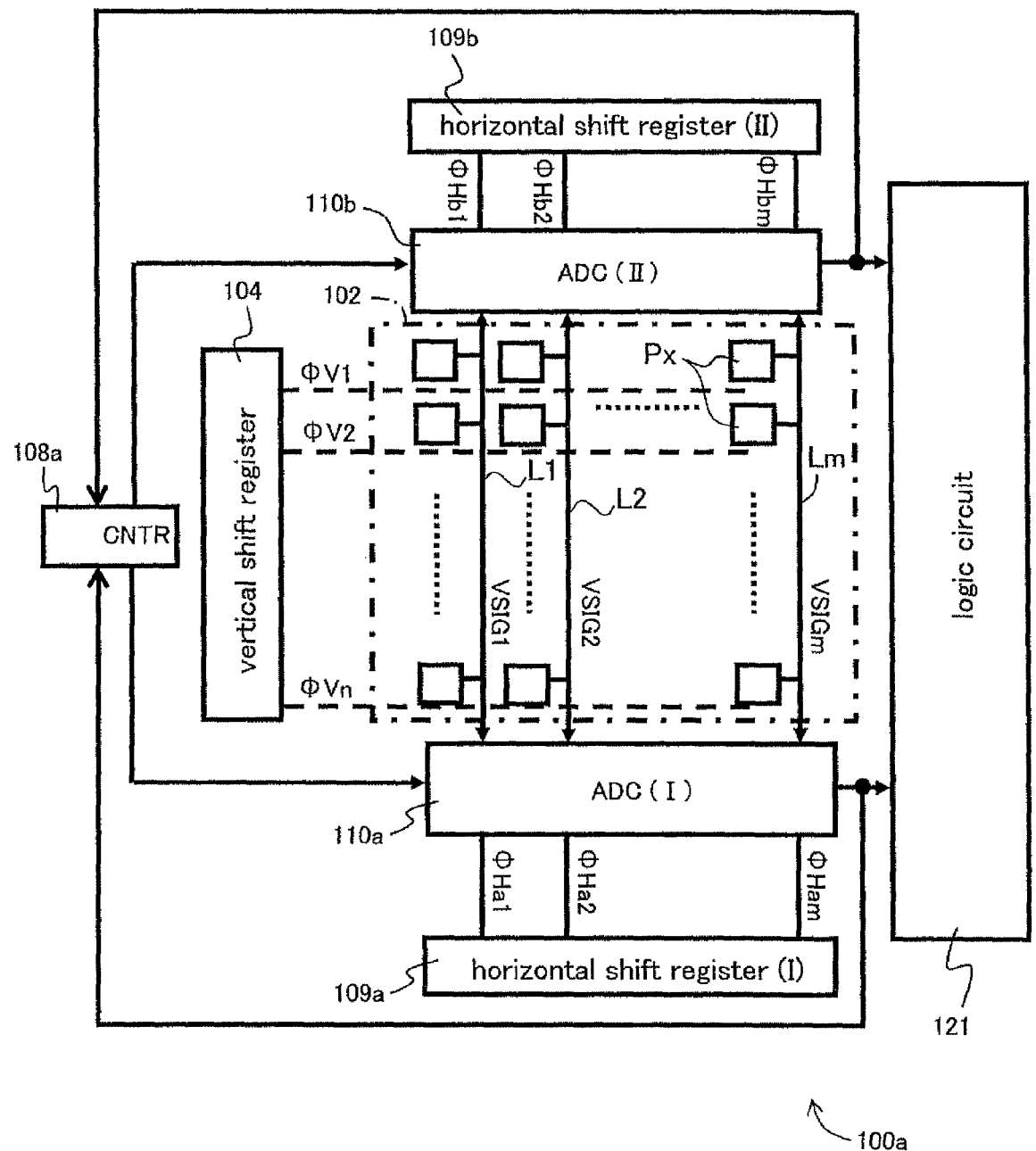
FIG. 7 is a diagram describing a solid-state image capturing apparatus according to Embodiment 2 of the present invention, illustrating an overall configuration of the solid-state image capturing apparatus.
Figure 8:
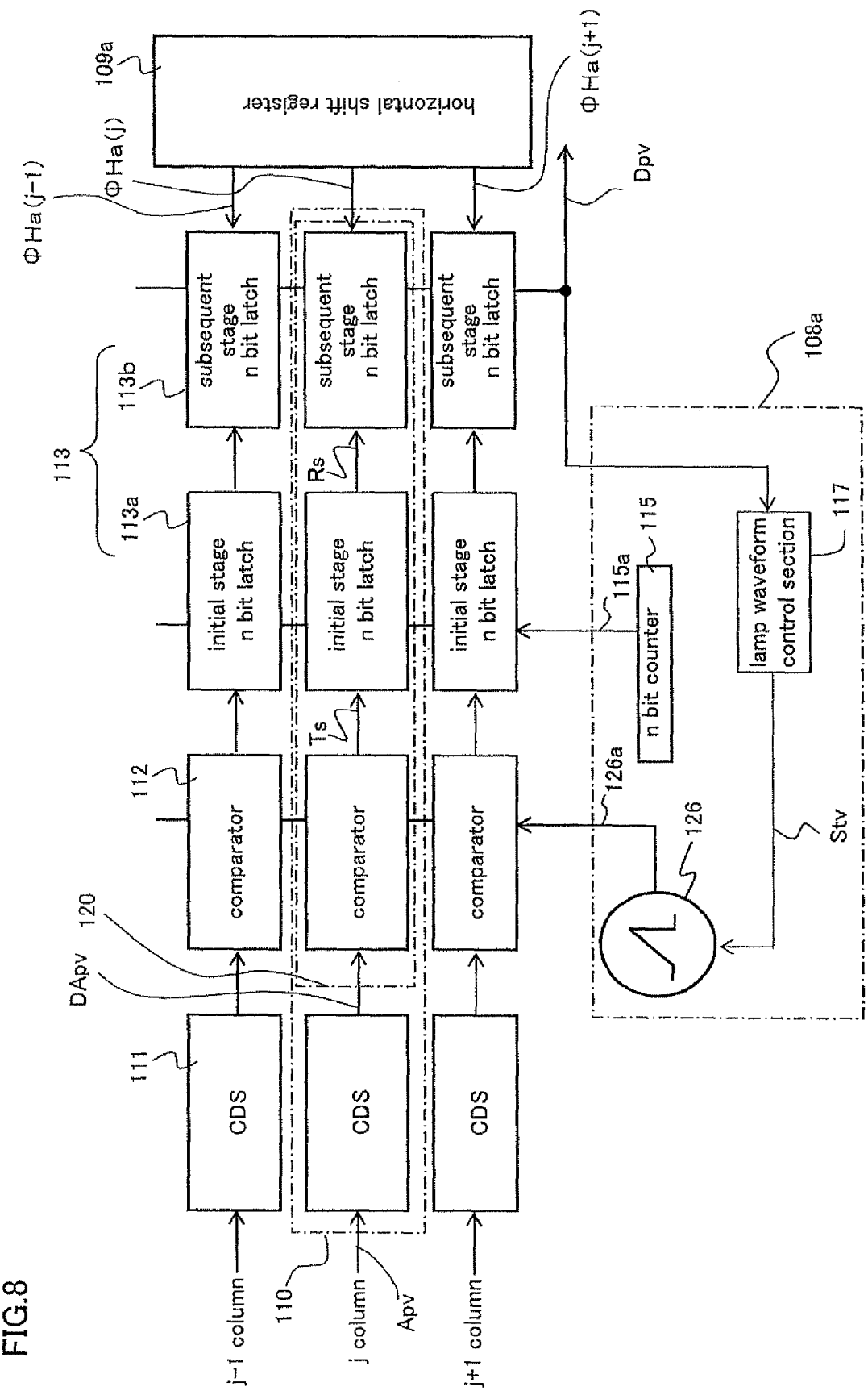
FIG. 8 is a block diagram illustrating a first AD conversion circuit and a control section in the solid-state image capturing apparatus according to Embodiment 2.

FIGS. 7 and 8 are each a diagram describing a solid-state image capturing apparatus according to Embodiment 2 of the present invention. FIG. 7 illustrates an overall configuration of the solid-state image capturing apparatus according to Embodiment 2, and FIG. 8 illustrates the configuration of an AD conversion circuit and its control section for an analog pixel signal in the solid-state image capturing apparatus.

Instead of the control section 108 of the solid-state image capturing apparatus 100 according to Embodiment 1 described above, the solid-state image capturing apparatus according to Embodiment 2 includes a control section 108a. The control section 108a includes: an n bit counter 115 for outputting a count signal; a ramp waveform generating section 126 for generating a ramp waveform 126a with a variable maximum amplitude value; and a ramp waveform control section 117 for controlling the ramp waveform generating section 126 such that the maximum amplitude value of the ramp waveform 126a changes based on an output Dpv of the first AD conversion circuit 110a. Herein, the reference value used for the feedback control of the maximum amplitude value of the ramp waveform 126a described above may be an average value, maximum value, minimum value or an intermediate value within a predetermined period of the output Dpv of the first AD conversion circuit 110a.

The control section 108a supplies a count signal 115a from the ramp waveform 126a and the counter 115 described above not only to the first AD converting circuit 110a but also to the second conversion circuit 110b (see FIG. 1). The rest of the configuration is the same as that of Embodiment 1 described above.

As described above, the maximum amplitude of the ramp waveform used for the AD conversion is variable, so that it becomes possible to set an appropriate dynamic range of the AD conversion in accordance with the brightness level of a subject with respect to the short time exposure analog pixel signal having a small analog signal level and with respect to the long time exposure analog pixel signal having a large analog signal level.

Embodiment 2 described above illustrates the configuration to perform feedback control on the maximum amplitude value of the ramp waveform used for the AD conversion in the first and second AD conversion circuits; however, the configuration to perform the feedback control on the maximum amplitude value of the ramp waveform used for the AD conversion both in the first and second AD conversion circuits is not limited to that of Embodiment 2 described above.

For example, the signal processing circuit described above may include a control section for controlling the first and second AD conversion circuits, and the control section includes a first control section and a second control section, the first control section including a first ramp waveform generating section for outputting a first ramp waveform signal with a variable waveform to a plurality of AD converters in the first AD conversion circuit provided for each column signal line; a first counter circuit for supplying a first count value to the plurality of AD converters; and a first ramp waveform control section for performing feedback control on the maximum amplitude value of the ramp waveform generated by the first ramp waveform generating section based on an average value within a predetermined period of the long time exposure digital pixel value, and the second control section including a second ramp waveform generating section for outputting a second ramp waveform signal with a variable waveform to a plurality of AD converters in the second AD conversion circuit provided for each column signal line; a second counter circuit for supplying a second count value to the plurality of AD converters; and a second ramp waveform control section for performing feedback control on the maximum amplitude value of the ramp waveform generated by the second ramp waveform generating section based on an average value within a predetermined period of the short time exposure digital pixel value; and the dynamic range for the AD conversion in each of the AD converters may be adjusted respectively by the waveform of the first and second ramp waveform signals in the first and second AD conversion circuits.

(Embodiment 3)

Figure 9:
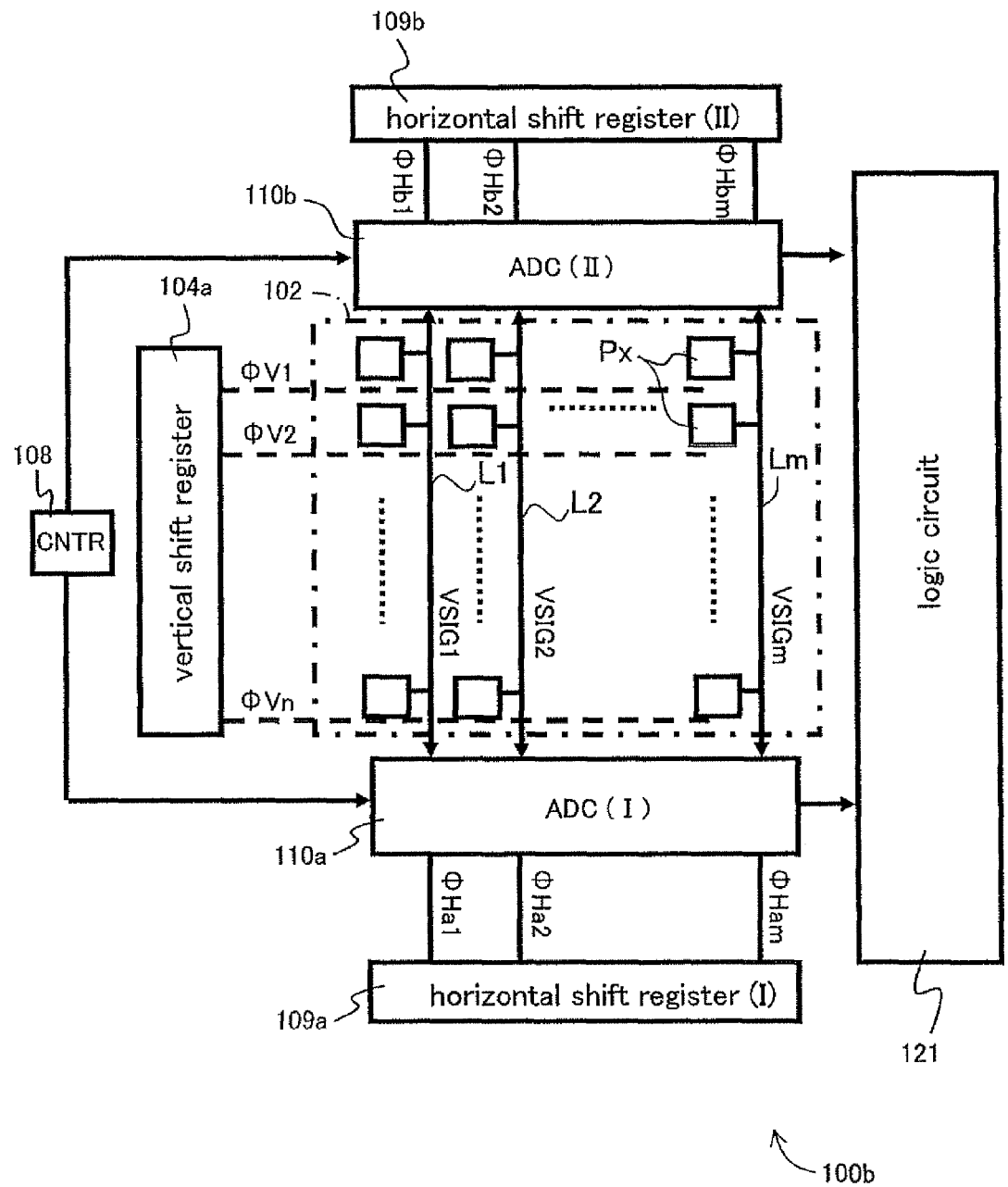
FIGS. 9 is a diagram describing a solid-state image capturing apparatus according to Embodiment 3 of the present invention, illustrating an overall configuration of the solid-state image capturing apparatus.
Figure 10:
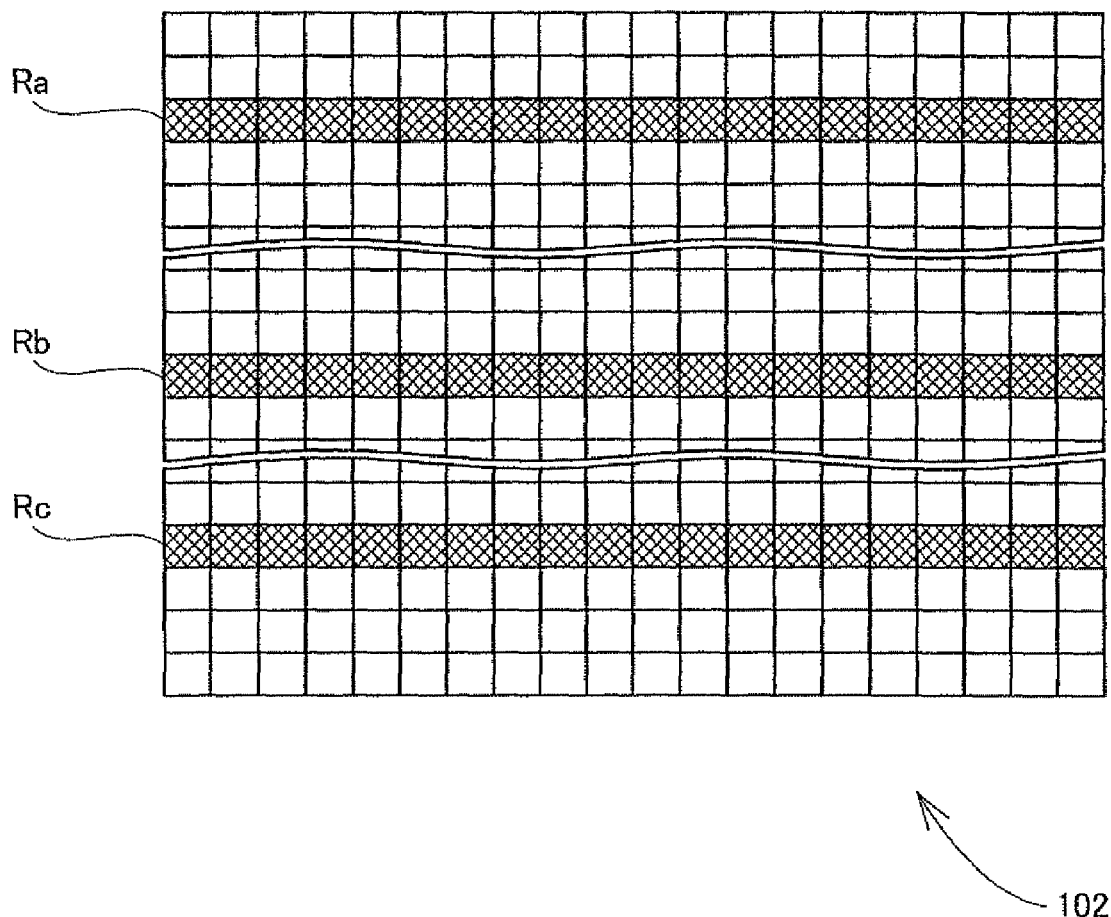
FIG. 10 is a schematic view describing timing of a pixel row selection operation according to Embodiment 3.
Figure 11:
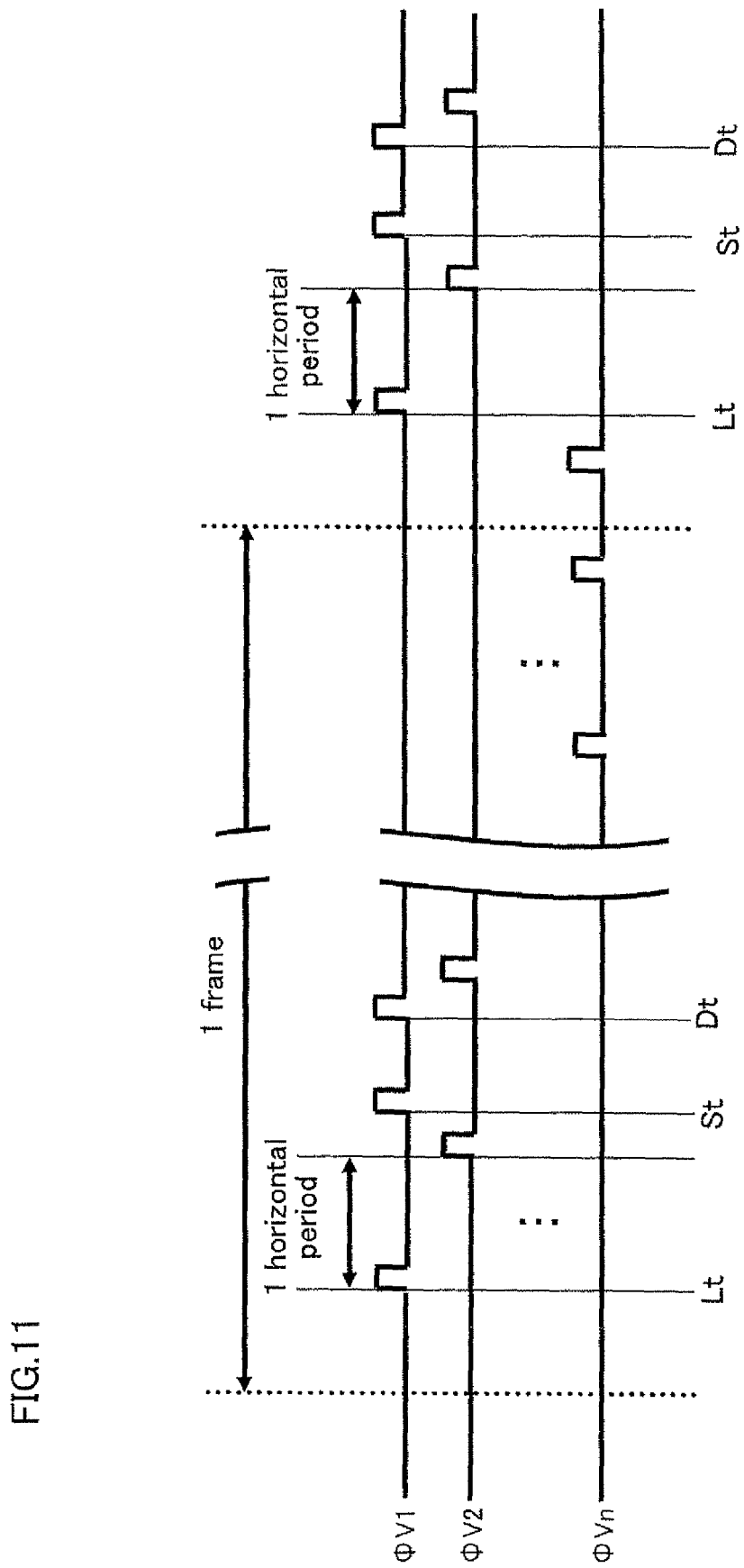
FIG. 11 is a waveform diagram describing an operation of the solid-state image capturing apparatus according to Embodiment 3, illustrating timing of occurrence of row selection pulses within one frame period.
Figure 12:
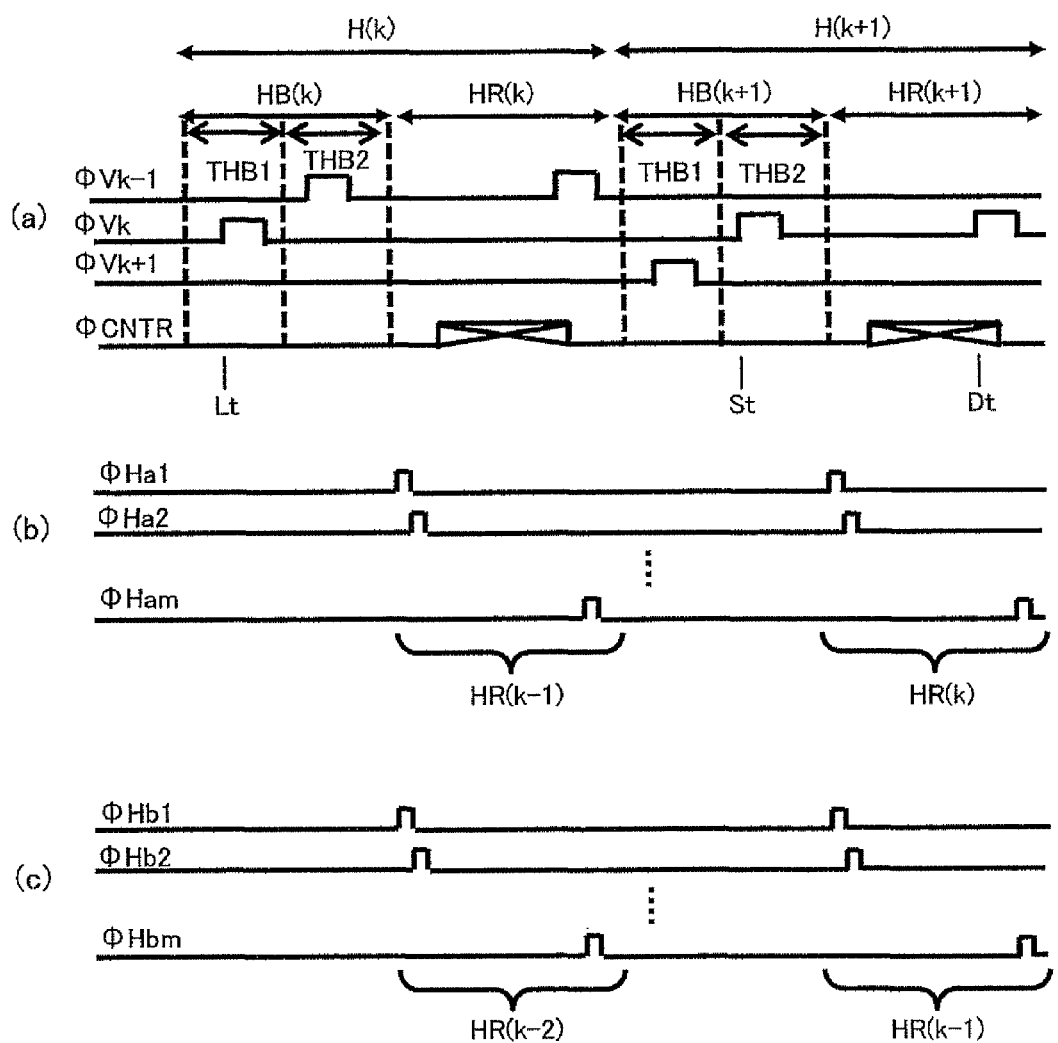
FIG. 12 is a waveform diagram describing an operation of the solid-state image capturing apparatus according to Embodiment 3, where FIG. 12(*a*) illustrates timing of occurrence of row selection pulses within one horizontal period, FIGS. 12(*b*) and 12(*c*) illustrate timing of occurrence of column selection pulses outputted from first and second horizontal shift registers.

FIGS. 9 to 12 are each a diagram describing a solid-state image capturing apparatus according to Embodiment 3 and a method for driving the solid-state image capturing apparatus. FIG. 9 is a block diagram illustrating the configuration of the solid-state image capturing apparatus according to Embodiment 3. FIG. 10 is a schematic view describing the operation of the solid-state image capturing apparatus according to Embodiment 3. FIGS. 11 and 12 are each a waveform diagram describing the operation of the solid-state image capturing apparatus according to Embodiment 3. FIG. 11 is a diagram illustrating the timing of occurrence of row selection pulses within one frame period. FIG. 12(a) is a diagram illustrating the timing of occurrence of row selection pulses within one horizontal period. FIGS. 12(b) and 12(c) are respectively diagrams illustrating the timing of occurrence of column selection pulses outputted from first and second horizontal shift registers.

A solid-state image capturing apparatus 100b according to Embodiment 3 is equal to the solid-state image capturing apparatus 100 according to Embodiment 1 in which the length of the period for the long time exposure is settable at any length.

That is, the solid-state image capturing apparatus 100b according to Embodiment 3 includes a vertical shift register 104a for performing selections of each pixel row three times within one frame period, instead of the vertical shift register 104 for performing selections of each pixel row twice within one frame period.

Among the selections of each pixel row performed three times within one frame period, the first and second pixel row selections (timing Lt and St) performed respectively at the timing Lt and St are operations for selecting pixel rows so that a signal charge is read out from a pixel (pixel signal read out operation). Further, the third pixel row selection performed at timing Dt is an operation for selecting a pixel row (shutter operation) to dispose of a signal charge accumulated in a pixel. Herein, a vertical shift register 104a has a configuration that is possible to set in advance timing Lt, timing St and timing Dt for selecting the first, second and third pixel row described above as any timing in one frame with units of one horizontal period. Alternately, it is possible to set the timing Lt, timing St and timing Dt of the operations for selecting the first, second and third pixel with one pixel period assigned to each pixel in one horizontal period as a unit.

The rest of the configuration of Embodiment 3 is the same as that of Embodiment 1 described above.

Next, the operation will be described herein.

According to Embodiment 3, the only point that is different from Embodiment 1 is that the selection for each pixel row (pixel row selection) is performed three times within one frame period and a signal charge accumulated in a pixel is disposed of in one pixel row selection (shutter operation) (timing Dt) among the three selections. Therefore, the shutter operation will be mainly described in the following description of the operation.

FIG. 11 illustrates, as selection pulses of pixel rows, selection pulses ΦV1 to ΦVn of a first to n-th pixel rows in a pixel area 102, and in particular, illustrates read out timing Lt of a long time exposure analog signal, read out timing St of a short time exposure analog signal, and disposing timing Dt of an accumulated electric charge with respect to the first pixel row. Furthermore, FIG. 12 illustrates, as selection pulses of pixel rows, selection pulses ΦV−1, ΦV, and ΦV+1 of the (k−1)th, k-th, and (k+1)th pixel rows in the pixel area 102, and in particular, illustrates read out timing Lt of a long time exposure analog signal, read out timing St of a short time exposure analog signal, and disposing timing Dt of an accumulated electric charge with respect to the k-th pixel row.

As illustrated in FIG. 10, each pixel row in the pixel area is selected as selection rows (that is, pixel rows to be selected) Ra to Rc within one frame period with a constant time interval provided therebetween.

In the pixel rows selected as the first and second selection rows Ra and Rb, a signal charge accumulated in each pixel is read out from each pixel of the selected pixel rows to each of corresponding column signal lines. In the pixel row selected as the third selection row Rc, a signal charge accumulated in each pixel will not be read out but will be disposed of.

Herein, the timing can be set, for example, as described below for selecting each pixel row as the first to third selection rows Ra, Rb and Rc. The timing Lt indicates timing in which each pixel row is selected as the first selection row Ra. The timing St indicates timing in which each pixel row is selected as a selection row Rb. The timing Dt indicates timing in which each pixel row is selected as a selection row Rc.

Specifically, the period from the timing Dt of a frame prior to one frame till the timing Lt of the next frame is determined as a substantial one frame period, and the period from the timing Lt till the timing St within one frame is determined as a substantial one horizontal period. In this case, when a pixel row is selected as the first selection row Ra (timing Lt), a signal charge of the selected pixel row is read out to a column signal line as a long time exposure analog pixel signal; and when the pixel row is selected as the second selection row Rb (timing St), a signal charge of the selected pixel row is read out to a column signal line as a short time exposure analog pixel signal. These data signals read out from a pixel as long time exposure analog pixel signals and short time exposure analog pixel signals are respectively outputted to corresponding first and second AD conversion circuits 110a and 110b as the difference with reset signals read out as analog pixel signals obtained at a dark time. The subsequent signal processing is performed as similar to that of the solid-state image capturing apparatus 100 according to Embodiment 1, and the long time exposure analog pixel signal and the short time exposure analog pixel signal are combined in the logic circuit 121.

Embodiment 3 with the configuration described above includes the vertical shift register 104a for performing selections of each pixel row three times within one frame period, and a signal charge accumulated in a pixel is disposed of at one of three pixel row selection operations within one frame period (disposing timing Dt). As a result, it is determined that the period from the disposing timing Dt of the frame prior to one frame till the first read out timing Lt of the next frame is a long time exposure period and that the period from the first read out timing Lt till the second readout timing St within one frame is a short time exposure time, and whereby the disposing timing described above is adjusted, so that it becomes possible to set the length of the long time exposure period appropriately in accordance with the brightness and the like of a subject.

In Embodiment 3, a case has been described where the period from the disposing timing Dt of the frame prior to one frame till the first read out timing Lt of the next frame is a long time exposure period and the period from the first read out timing Lt till the second read out timing St within one frame is a short time exposure time; however, the period from the disposing timing Dt of the frame prior to one frame till the first read out timing Lt of the next frame may be a short time exposure period and the period from the first read out timing Lt till the second read out timing St within one frame may be a long time exposure time. In such a case, the disposing timing described above is adjusted, so that it becomes possible to set the length of the short time exposure period appropriately in accordance with the brightness of a subject.

Further, in Embodiment 3 described above, the third operation among the three pixel row selection operations within one frame period is a shutter operation to dispose of a signal charge accumulated in a pixel; however, the shutter operation to dispose of a signal charge may be performed at any timing among the three pixel row operations within one frame period.

For example, among the three pixel row selection operations within one frame period, the first and third pixel row selection operations may be a pixel signal read out operation for reading out a signal charge obtained by exposure in each pixel of the selected pixel row to a corresponding column signal line; and among the three pixel row selection operations, the second pixel row selection operation may be a shutter operation to dispose of a signal charge obtained by exposure of each pixel of the selected pixel row.

In this case, by setting the period from the second pixel row selection till the third pixel row selection in one frame shorter than the period from the third pixel row selection of that one frame till the first pixel row selection of the frame next to that preceding frame, a long time exposure analog pixel signal corresponding to the signal charge obtained by a long time exposure in each pixel of the selected pixel row is read out to a corresponding column signal line at the first pixel row selection of each frame; and a short time exposure analog pixel signal corresponding to the signal charge obtained by a short time exposure in each pixel of the selected pixel row is read out to a corresponding column signal line at the third pixel row selection of each frame.

Furthermore, by adjusting the timing of the shutter operation (second pixel row selection) based on an average value within a predetermined period of the long time exposure digital pixel value and performing feedback control on the short time exposure time, it becomes possible to set the length of the short time exposure time appropriately in accordance with the brightness and the like of a subject.

Furthermore, according to Embodiment 3, the vertical shift register 104a performs the selection of each pixel row three times within one frame period, as what is described as the solid-state image capturing apparatus 100b; however, the vertical shift register 104a may make a selection of each pixel row four times within one frame period, and the first disposing timing and second disposing timing may be provided to select a pixel row such that a signal charge is disposed from a pixel respectively prior to a predetermined period of the first read out timing Lt and the second read out timing St. In this case, the first disposing timing and the second disposing timing are adjusted, so that it becomes possible to set both of the length of the long time exposure time and the length of the short time exposure time appropriately in accordance with the brightness and the like of a subject.

Furthermore, in Embodiment 3, it is described that the vertical shift register 104a can set the timing Dt of the shutter operation (third pixel row selection) for disposing of a signal charge accumulated in a pixel at any timing within one frame; however, the timing Dt of the shutter operation (third pixel row selection) may be determined by feedback control such that the long time exposure time or short time exposure time becomes appropriate in accordance with an image of a subject.

(Embodiment 4)

Hereinafter, a solid-state image capturing apparatus according to Embodiment 4 will be specifically described, which is equal to the solid-state image capturing apparatus according to Embodiment 3 in which a feedback control is performed on the timing of the shutter operation (third pixel row selection operation).

Figure 13:
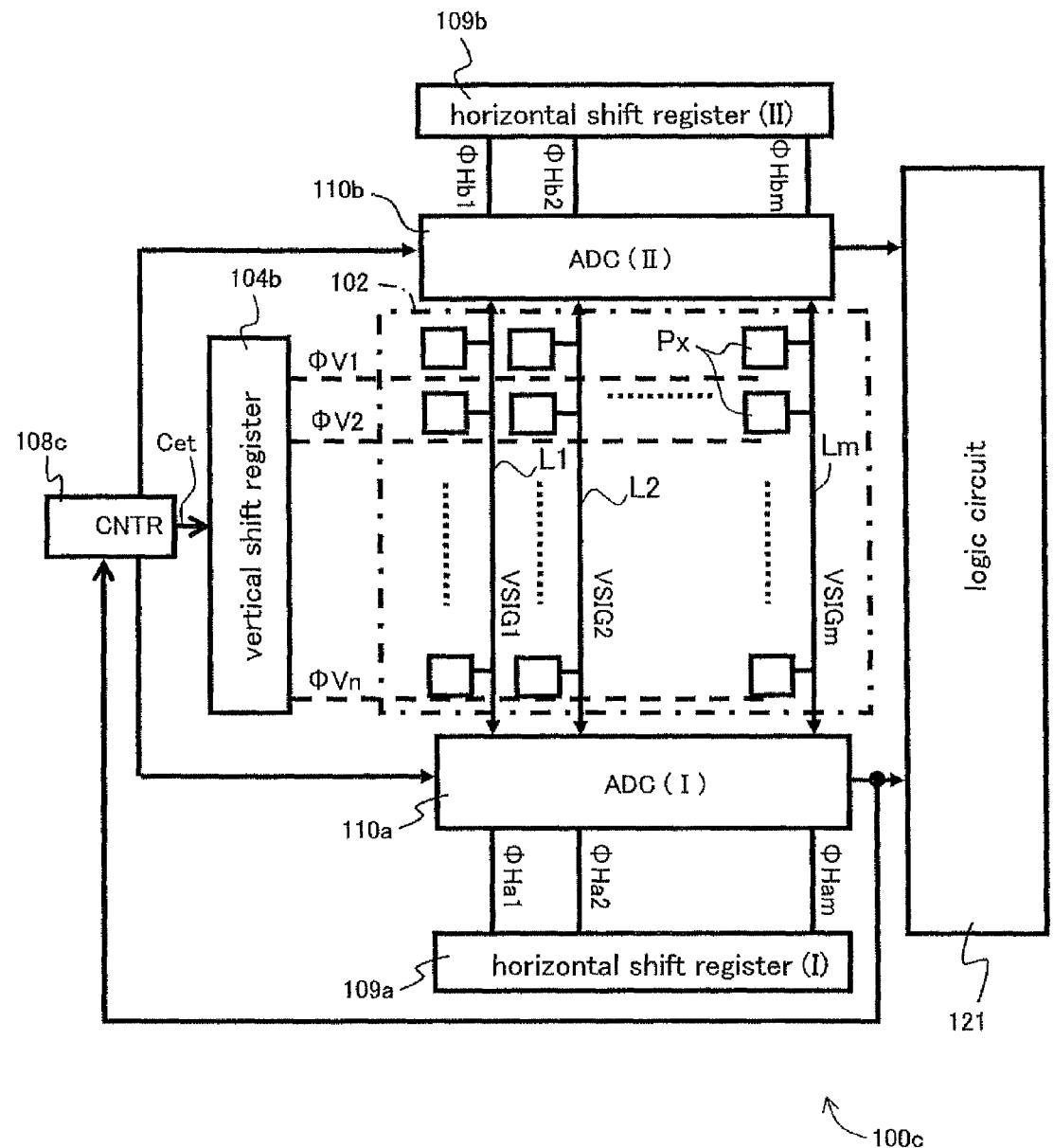
FIG. 13 is a diagram describing a solid-state image capturing apparatus according to Embodiment 4 of the present invention, illustrating an overall configuration of the solid-state image capturing apparatus.
Figure 14:
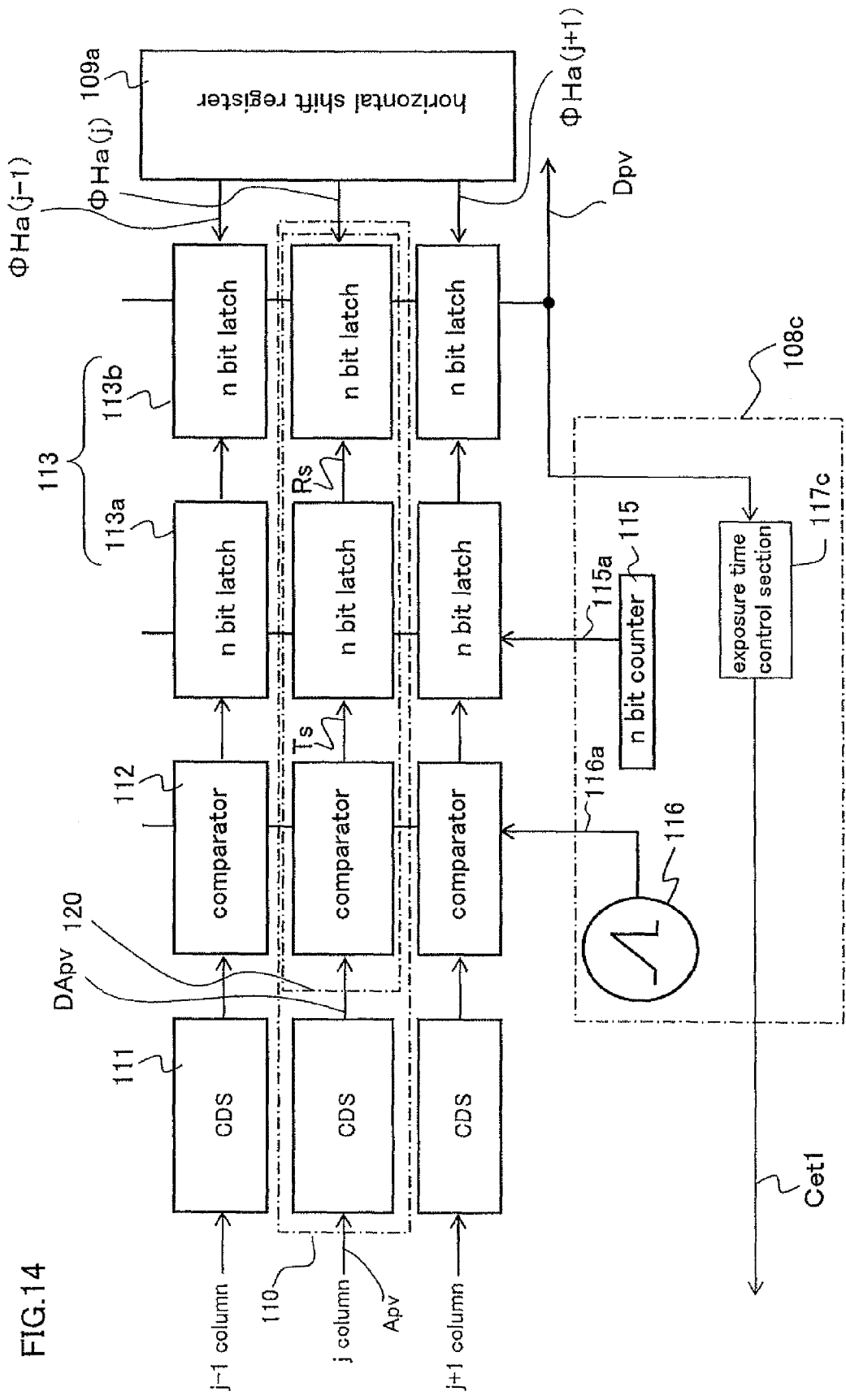
FIG. 14 is a block diagram describing an AD conversion circuit in the solid-state image capturing apparatus according to Embodiment 4 of the present invention.

FIGS. 13 and 14 are each a diagram describing a solid-state image capturing apparatus according to Embodiment 4 of the present invention. FIG. 13 illustrates an overall configuration of the solid-state image capturing apparatus according to Embodiment 4. FIG. 14 illustrates an AD conversion circuit and its control section for an analog pixel signal in the solid-state image capturing apparatus.

Instead of the control section 108 of the solid-state image capturing apparatus 100b of Embodiment 3, a solid-state image capturing apparatus 100c of Embodiment 4 includes a control section 108c, and the control section 108c includes: an n bit counter 115 for outputting a count signal 115a; a ramp waveform generating section 116 for generating a ramp waveform 116a; and an exposure time control section 117c for controlling the vertical shift register 104b described above by an exposure time controlling signal Cet1 such that the timing of a shutter operation that defines the length of the long time exposure time is adjusted based on an output Dpv of the first AD conversion circuit 110a. Herein, the reference value used for the feedback control of the long time exposure time described above may be an average value, maximum value, minimum value or an intermediate value within a predetermined period of the output Dpv of the first AD conversion circuit 110a. The rest of the configuration is the same as that of Embodiment 3 described above.

In Embodiment 4 as described above, the vertical shift register 104b is controlled by the exposure time control signal Cet1 such that the timing of a shutter operation that defines the length of the long time exposure time is adjusted based on the output Dpv of the first AD conversion circuit 110a, so that the long time exposure time is adjusted in accordance with an image of a subject, thereby optimizing the dynamic range of the long time exposure analog pixel signal and thus optimizing the dynamic range of the digital pixel value obtained by the combination of the long time exposure digital pixel value and the short time exposure digital pixel value.

(Embodiment 5)

Figure 15:
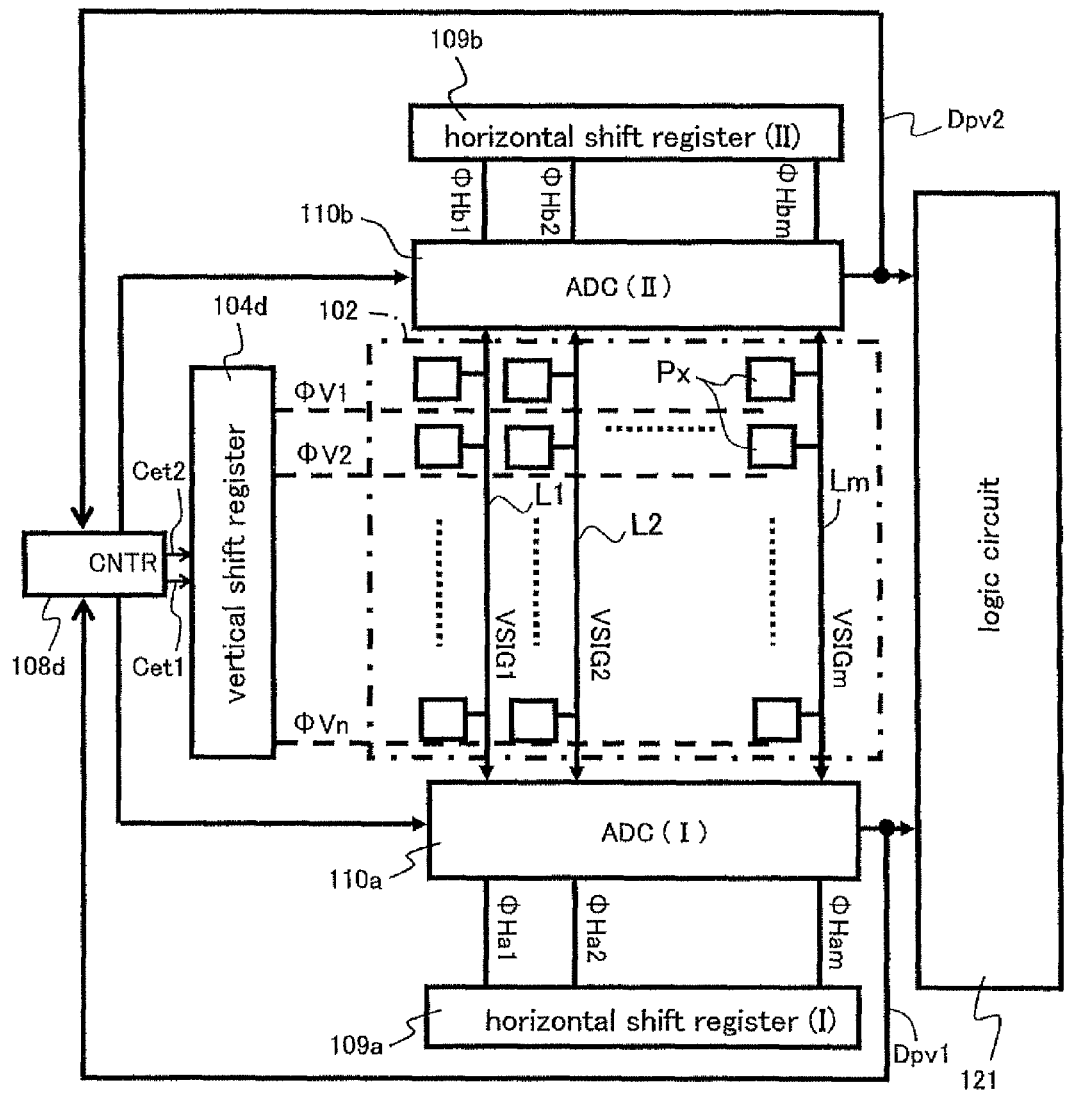
FIG. 15 is a diagram describing a solid-state image capturing apparatus according to Embodiment 5 of the present invention, illustrating an overall configuration of the solid-state image capturing apparatus.
Figure 16:
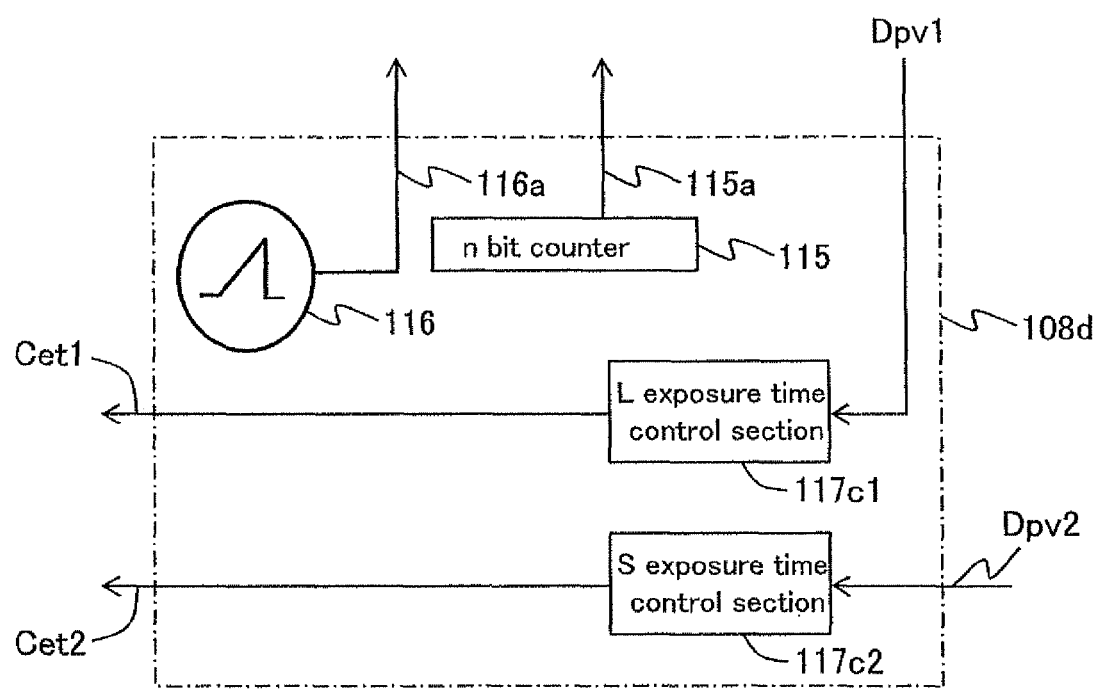
FIG. 16 is a block diagram illustrating a configuration of a control section in the solid-state image capturing apparatus according to Embodiment 5.
Figure 17:
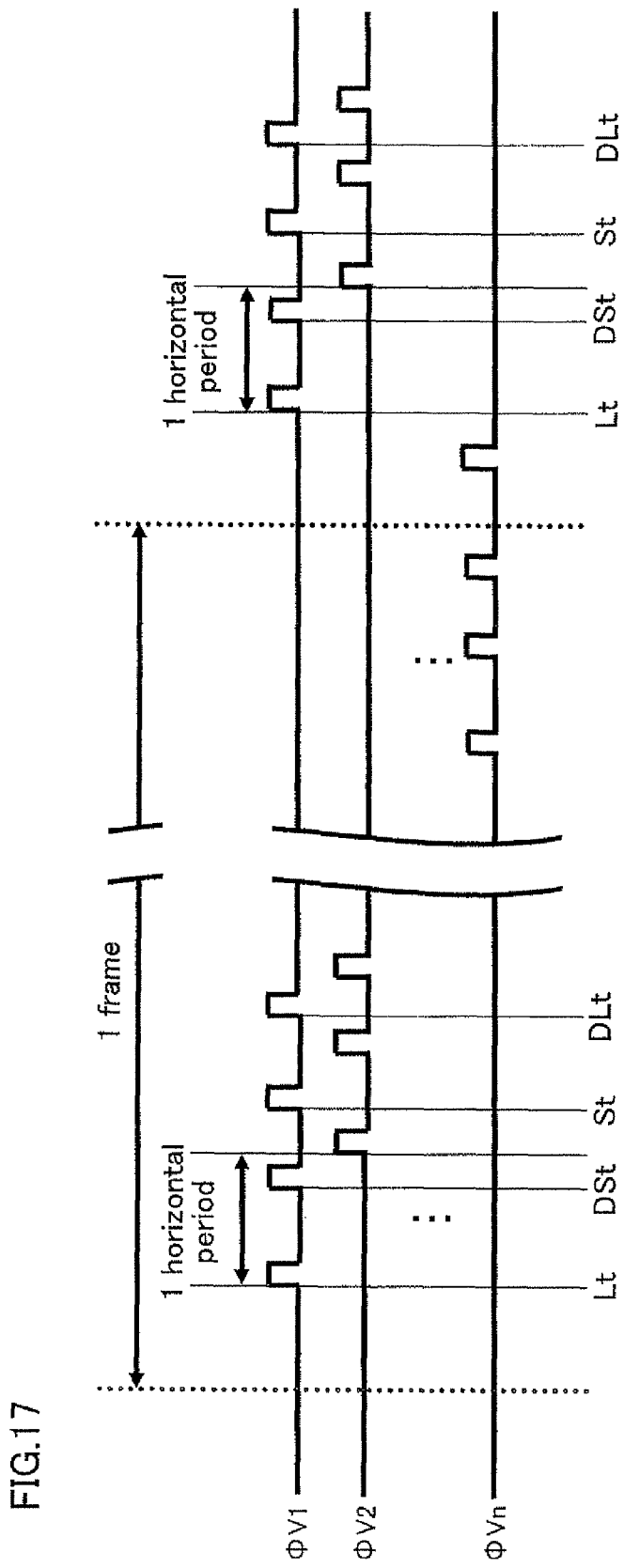
FIG. 17 is a waveform diagram describing an operation of the solid-state image capturing apparatus according to Embodiment 5, illustrating timing of occurrence of row selection pulses within one frame period.
Figure 18:
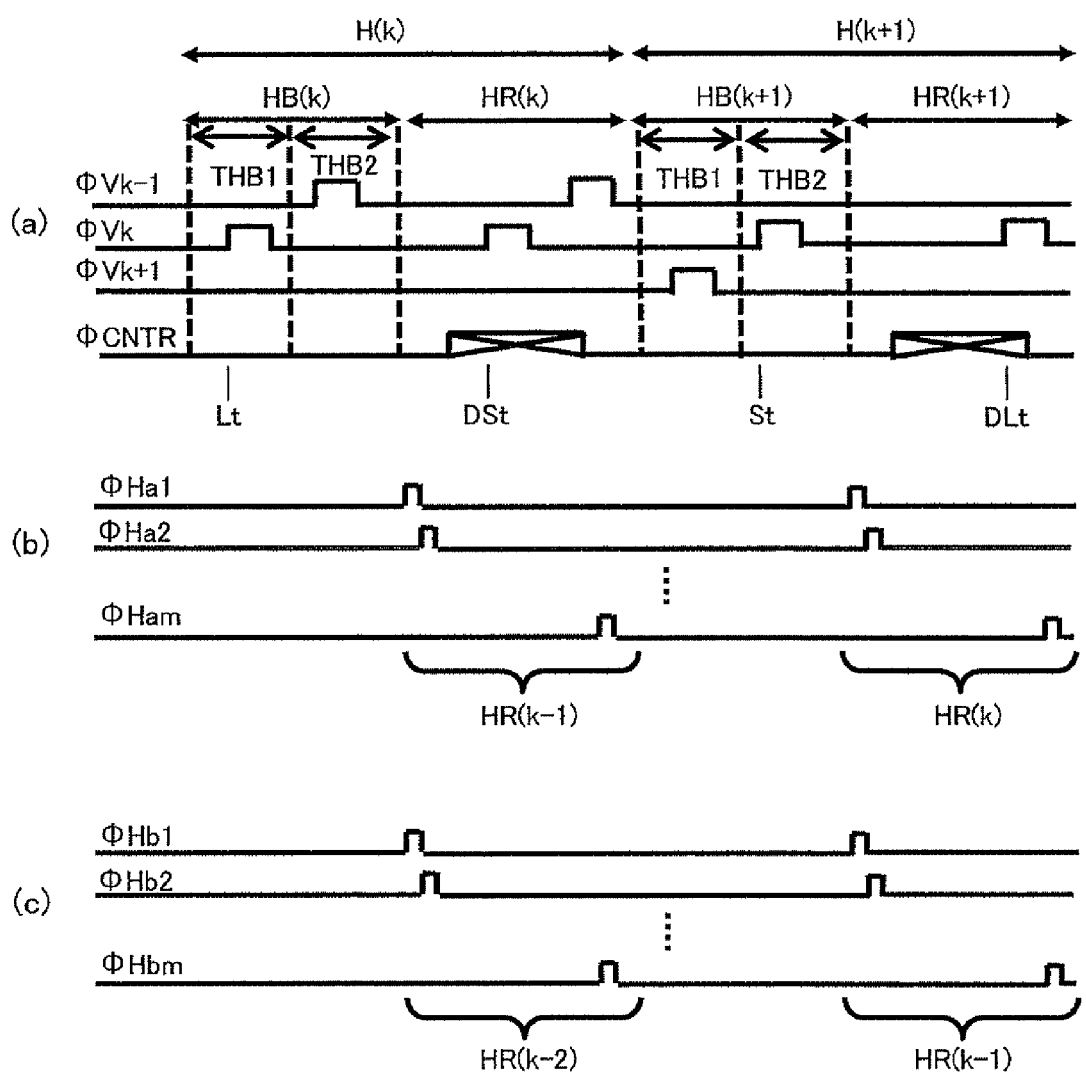
FIG. 18 is a waveform diagram describing an operation of the solid-state image capturing apparatus according to Embodiment 5, where FIG. 18(*a*) illustrates timing of occurrence of row selection pulses within one horizontal period, and FIGS. 18(*b*) and 18(*c*) illustrate timing of occurrence of column selection pulses outputted by first and second horizontal shift registers respectively.

FIGS. 15 to 18 are each a diagram describing a solid-state image capturing apparatus according to Embodiment 5 of the present invention and a method for driving the solid-state image capturing apparatus. FIG. 15 is a block diagram illustrating an overall configuration of the solid-state image capturing apparatus according to Embodiment 5. FIG. 16 is a block diagram illustrating a configuration of a control section of the solid-state image capturing apparatus. FIGS. 17 and 18 are each a waveform diagram describing an operation of the solid-state image capturing apparatus according to Embodiment 5. FIG. 17 illustrates timing of occurrence of row selection pulses within one frame period. FIG. 18(a) illustrates timing of occurrence of row selection pulses within one horizontal period. FIGS. 18(b) and 18(c) illustrate timing of occurrence of column selection pulses outputted by the first and second horizontal shift registers respectively.

A solid-state image capturing apparatus 100d according to Embodiment 5 is equal to the solid-state image capturing apparatus 100 according to Embodiment 1 in which the length of each of the periods for the long time exposure and the short time exposure is settable at any length.

That is, the solid-state image capturing apparatus 100d according to Embodiment 5 includes a vertical shift register 104d that is capable of changing the timing for selecting a pixel column, instead of the vertical shift register 104 in the solid-state image capturing apparatus 100 according to Embodiment 1. The vertical shift register 104d performs a selection operation of each pixel row four times within one frame period, and selects a pixel row such that a signal charge is disposed from a pixel at signal disposing timing DSt and signal disposing timing DLt (second pixel row selection operation timing and fourth pixel row selection operation timing) prior to a predetermined period of pixel signal read out timing Lt and pixel signal read out timing St (first pixel row selection operation timing and third pixel row selection operation timing).

Furthermore, instead of the control section 108 of the solid-state image capturing apparatus 100a according to Embodiment 1, the solid-state image capturing apparatus 100d according to Embodiment 5 includes: an n bit counter 115 for outputting a count signal 115a; a ramp waveform generating section 116 for generating a ramp waveform 116a; an exposure time control section 117c1 for controlling the vertical shift register 104d by an exposure time control signal Cet1 such that timing DLt of the shutter operation (fourth pixel row selection operation) that defines a length of a long time exposure time is adjusted based on an output Dpvl of a first AD conversion circuit 110a; and an exposure time control section 117c2 for controlling the vertical shift register 104d by an exposure time control signal Cet2 such that timing DSt of the shutter operation (third pixel row selection operation) that defines a length of a short time exposure time is adjusted based on an output Dpv2 of a second AD conversion circuit 110b. Herein, the reference value used for the feedback control of the long time exposure time and the short time exposure time described above may be an average value, maximum value, minimum value or an intermediate value within a predetermined period of the output Dpv1 and the output Dpv2 of the first and second AD conversion circuits 110a and 110b. The rest of the configuration in Embodiment 5 is the same as that of Embodiment 1 described above.

Next, the operation will be described hereinafter.

FIG. 17 is used to describe the operation, and illustrates selection pulses ΦV1 to ΦVn of a first to n-th pixel rows in a pixel area 102 as selection pulses of pixel rows, and in particular, illustrates read out timing Lt of a long time exposure analog signal, read out timing St of a short time exposure analog signal, disposing timing DSt and disposing timing DLt of an accumulated electric charge with respect to the first pixel row. Furthermore, FIG. 18 illustrates, as selection pulses of pixel rows, selection pulses ΦV−1, ΦV, and ΦV+1 of the (k−1)th, k-th, and (k+1)th pixel rows in the pixel area 102, and in particular, illustrates read out timing Lt of a long time exposure analog signal, read out timing St of a short time exposure analog signal, disposing timing DSt and disposing timing DLt of an accumulated electric charge with respect to the k-th pixel row.

Herein, the timing in which each pixel row is selected by the first to fourth pixel row selection operations described above can be particularly set as follows.

That is, the period from the timing DLt of a frame prior to one frame till the timing Lt of the next frame is determined as a substantial one frame period, and the period from the timing Lt till the timing St within one frame is determined as a substantial one horizontal period, and the period from the timing DSt till the timing St is determined as a period shorter than the one horizontal period.

In this case, when a pixel row is selected by a pixel signal read out operation (first pixel row selection operation) (timing Lt), a signal charge of the selected pixel row is read out to a column signal line as a long time exposure analog pixel signal from the timing DLt of one frame till the timing Dt of the next frame; and when a pixel row is selected by a shutter operation (second pixel row selection operation) (timing DSt), a signal charge of the selected pixel row is disposed of. Further, when a pixel row is selected by a pixel signal read out operation (third pixel row selection operation) (timing St), a signal charge of the selected pixel row is read out to the column signal line as a short time exposure analog pixel signal. Subsequently, when a pixel row is selected by a shutter operation (fourth pixel row selection operation) (timing DLt), a signal charge of the selected pixel row is disposed of. Further, when a pixel row is selected by the first pixel row selection operation in the next frame (timing Lt), a signal charge of the selected pixel row is read out to a column signal line.

Furthermore, according to Embodiment 5, a first exposure time control section 117c1 in a control section 108d adjusts timing DLt of the shutter operation (fourth pixel row selection operation) described above that defines the length of a long time exposure time based on an output Dpv1 of the first AD conversion circuit 110a. Furthermore, a second exposure time control section 117c2 in the control section 108d adjusts timing DSt of the shutter operation (second pixel row selection operation) described above that defines the length of a short time exposure time based on an output Dpv2 of the second AD conversion circuit 110b. The subsequent signal processing is performed as similar to the solid-state image capturing apparatus according to Embodiment 1, and a long time exposure analog pixel signal and a short time exposure analog pixel signal are combined with each other in the logic circuit.

According to Embodiment 5 with the structure described above, the vertical shift register 104d is controlled by the exposure time controlling signal Cet1 such that the timing DLt of the shutter operation described above that defines the length of the long time exposure time is adjusted based on the output Dpv1 of the first AD conversion circuit 110a as well as the vertical shift register 104d is controlled by the exposure time controlling signal Cet2 such that the timing DSt of the shutter operation described above that defines the length of the short time exposure time is adjusted based on the output Dpv2 of the second AD conversion circuit 110b. As a result, the long time exposure time and the short time exposure time are adjusted in accordance with an image of a subject, thereby optimizing the dynamic range of the long time exposure analog pixel signal together with the dynamic range of the short time exposure analog pixel signal and thus optimizing the dynamic range of the digital pixel value obtained by the combination of the longtime exposure digital pixel value and the short time exposure digital pixel value.

Although not particularly described in Embodiments 3 to 5 described above, it is needless to say that the shutter operation for disposing of a signal charge may be performed during the blanking period HB(k) of one horizontal period H(k) or during the horizontal signal processing period HR(k) after the blanking period HB(k) of one horizontal period H(k).

Furthermore, although not particularly described in Embodiments 1 to 5 described above, an electronic information device having the solid-state image capturing apparatus according to any of Embodiments 1 to 5 as an image input device used in an image capturing section thereof will be described. As such an electronic information device, a digital camera (e.g., a digital video camera and a digital still camera), an image input camera, a scanner, a facsimile machine, and a camera-equipped cell phone device can be mentioned.

(Embodiment 6)

Figure 19:
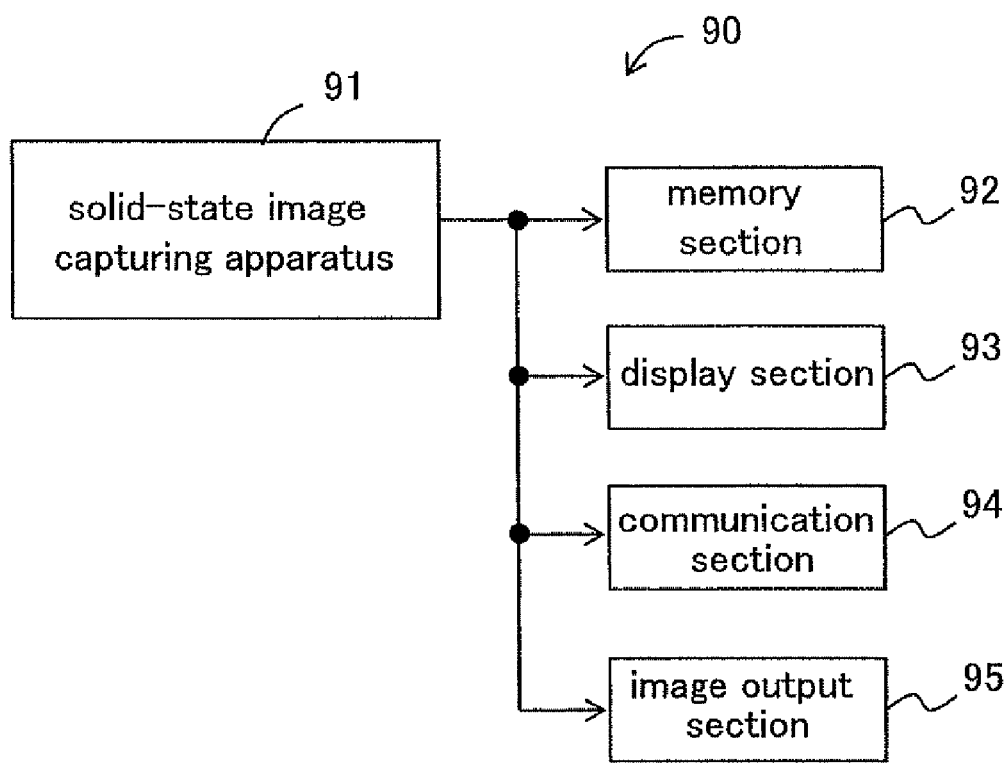
FIG. 19 is a block diagram illustrating an exemplary diagrammatic structure of an electronic information device, as Embodiment 6 of the present invention, using the solid-state image capturing apparatus according to any of Embodiments 1 to 5 described above in an image capturing section.

FIG. 19 is a block diagram illustrating an exemplary diagrammatic structure of an electronic information device, as Embodiment 6 of the present invention, using the solid-state image capturing apparatus according to any of Embodiments 1 to 5 described above in an image capturing section.

An electronic information device 90 according to Embodiment 6 of the present invention as illustrated in FIG. 19 includes at least an image capturing section 91 in which any of the solid-state image capturing apparatuses according to Embodiment 1 to 5 of the present invention is used; and the electronic information device 90 may include a memory section 92 (e.g., recording media) for data-recording a high-quality image data obtained by using the image capturing section after a predetermined signal process is performed on the image data for recording; a display section 93 (e.g., liquid crystal display device) for displaying this image data on a display screen (e.g., liquid crystal display screen) after a predetermined signal process is performed for display; a communication section 94 (e.g., transmitting and receiving device) for communicating this image data after a predetermined signal process is performed on the image data for communication; and an image output section 95 for printing (typing out) and outputting (printing out) this image data.

As described above, the present invention is exemplified by the use of its preferred embodiments. However, the present invention should not be interpreted solely based on the embodiments described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

INDUSTRIAL APPLICABILITY

The present invention can be applied in the field of a solid-state image capturing apparatus for performing a pixel row selecting operation to obtain an image signal with a wide dynamic range, by a short time exposure and a long time exposure, a driving method of the solid-state image capturing apparatus, and an electronic information device having the solid-state image capturing apparatus used therein. According to the present invention, a long time exposure analog pixel signal and a short time exposure analog pixel signal are AD converted simultaneously into respective digital pixel values, and the digital pixel values of the long time exposure analog pixel signal and the short time exposure analog pixel signal are mixed, so that it becomes possible to avoid using a field memory that causes the increase in the chip size, and avoid the influence of leak current for a data signal to be sample-held, while widening the dynamic range of a captured image.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A solid-state image capturing apparatus comprising:
a pixel area in which pixels for generating a signal charge by a photoelectric conversion on an incident light are arranged in a two dimensional matrix;
a row selection section for selecting each pixel row of the pixel area, and successively outputting a pixel value of each pixel of a pixel row selected by the row selection section;
a plurality of column signal lines provided for each pixel column in the pixel area; and
a signal processing circuit for generating a digital pixel value from an analog pixel signal of each pixel that is read out to each of the column signal lines, said signal processing circuit comprising:
a first AD conversion circuit that simultaneously AD converts a long time exposure analog pixel signal, which corresponds to a signal charge obtained by long time exposure, from each pixel of the selected pixel row into a long time exposure digital pixel value; and
a second AD conversion circuit that simultaneously AD converts a short time exposure analog pixel signal, which corresponds to a signal charge obtained by short time exposure, from each pixel of the selected pixel row into a short time exposure digital pixel value;
wherein the row selection section selects each pixel row such that:
the long time exposure analog pixel signal and the short time exposure analog pixel signal are read out as the analog pixel signal from each pixel row to a column signal line corresponding to each pixel within one frame period; and
in a horizontal period corresponding to each pixel row, the long time exposure analog pixel signal is read out from each pixel of one pixel row to a corresponding column signal line within a first horizontal blanking period, and the short time exposure analog pixel signal is read out from each pixel of other pixel row adjacent to the one pixel row, to a corresponding column signal line within a second horizontal blanking period subsequent to the first horizontal blanking period;
wherein the first AD conversion circuit performs an AD conversion on the long time exposure analog pixel signal, which is read out to the column signal line within the first horizontal blanking period, within a remaining signal processing period subsequent to the second horizontal blanking period within the horizontal period corresponding to each pixel row; and
the second AD conversion circuit performs an AD conversion on the short time exposure analog pixel signal, which is read out to the column signal line within the second horizontal blanking period, within the remaining signal processing period in parallel with the AD conversion on the long time exposure analog pixel signal in the first AD conversion circuit.

2. A solid-state image capturing apparatus according to claim 1, wherein the first and second AD conversion circuits, which configure the signal processing circuit, include a plurality of AD converters provided for each column signal line, for converting the analog pixel signal of each pixel of the selected pixel row, which is read out to each of the column signal lines, into a digital pixel value.

3. A solid-state image capturing apparatus according to claim 2, wherein:
the row selection section selects each pixel row three times or more within one frame;
at a time of at least one selection of the pixel row among the three selections, a signal charge obtained by exposure is disposed from each pixel of the selected pixel row;
at one of the other two selections of the pixel row among the three selections, a long time exposure analog pixel signal, which corresponds to a signal charge obtained by long time exposure in each pixel of the selected pixel row, is read out to a corresponding column signal line; and
at the other one of the other two selections of the pixel row among the three selections, a short time exposure analog pixel signal, which corresponds to a signal charge obtained by short time exposure in each pixel of the selected pixel row, is read out to a corresponding column signal line.

4. A solid-state image capturing apparatus according to claim 3, wherein the row selection section sets timing for selecting each pixel row with one horizontal period as a unit.

5. A solid-state image capturing apparatus according to claim 3, wherein the row selection section sets timing for selecting each pixel row with one pixel period as a unit, the one pixel period being a period assigned to each pixel of each pixel row within one horizontal period.

6. A solid-state image capturing apparatus according to claim 3, wherein:
the row selection section selects each pixel row three times within a period that corresponds to one frame;
at the time of a first pixel row selection, a signal charge, which is obtained by exposure, of each pixel of the selected pixel row is disposed of;
at the time of a second pixel row selection, a signal charge, which is obtained by exposure in each pixel of the selected pixel row during a period from the time of the first pixel row selection till the time of the second pixel row selection, is read out to a corresponding column signal line;

at the time of a third pixel row selection, a signal charge, which is obtained by exposure in each pixel of the selected pixel row during a period from the time of the second pixel row selection till the time of the third pixel row selection, is read out to a corresponding column signal line.

7. A solid-state image capturing apparatus according to claim 6, wherein:

a period from the time of the first pixel row selection till the time of the second pixel row selection is longer than a period from the time of the second pixel row selection till the time of the third pixel row selection;

at the time of the second pixel row selection, the long time exposure analog pixel signal, which corresponds to a signal charge obtained by long time exposure in each pixel of the selected pixel row, is read out to a corresponding column signal line; and at the time of the third pixel row selection, the short time exposure analog pixel signal, which corresponds to a signal charge obtained by short time exposure in each pixel of the selected pixel row, is read out to a corresponding column signal line.

8. A solid-state image capturing apparatus according to claim 7, wherein the control section includes an exposure time control section for adjusting the time of the first pixel row selection based on an average value within a predetermined period of the long time exposure digital pixel value to perform feedback control on the long time exposure time.

9. A solid-state image capturing apparatus according to claim 6, wherein:

the time of the first pixel row selection till the time of the second pixel row selection is shorter than the time of the second pixel row selection till the time of the third pixel row selection;

at the time of the second pixel row selection, the short time exposure analog pixel signal, which corresponds to a signal charge obtained by short time exposure in each pixel of the selected pixel row, is read out to a corresponding column signal line;

at the time of the third pixel row selection, the long time exposure analog pixel signal, which corresponds to a signal charge obtained by long time exposure in each pixel of the selected pixel row, is read out to a corresponding column signal line.

10. A solid-state image capturing apparatus according to claim 9, wherein the control section includes an exposure time control section for adjusting timing of the first pixel row selection based on an average value within a predetermined period of the short time exposure digital pixel value to perform feedback control on the short time exposure time.

11. A solid-state image capturing apparatus according to claim 3, wherein:

the row selection section selects each pixel row three times within a period that corresponds to one frame;

at the time of the first pixel row selection, a signal charge, which is obtained by exposure in each pixel of the selected pixel row during a period from the time of a preceding third pixel row selection till the time of the first pixel row selection, is read out to a corresponding column signal line;

at the time of the second pixel row selection, a signal charge, which is obtained by exposure, of each pixel of the selected pixel row is disposed of; and at the time of the third pixel row selection, a signal charge, which is obtained by exposure in each pixel of the selected pixel row during a period from the time of the second pixel row selection till the time of the third pixel row selection, is read out to a corresponding column signal line.

12. A solid-state image capturing apparatus according to claim 11, wherein:

the period from the second pixel row selection till the time of the third pixel row selection is shorter than the period from the third pixel row selection till the time of a next first pixel row selection;

at the time of the first pixel row selection, the long time exposure analog pixel signal, which corresponds to a signal charge obtained by long time exposure in each pixel of the selected pixel row, is read out to a corresponding column signal line; and at the time of the third pixel row selection, the short time exposure analog pixel signal, which corresponds to a signal charge obtained by short time exposure in each pixel of the selected pixel row, is read out to a corresponding column signal line.

13. A solid-state image capturing apparatus according to claim 12, wherein the control section includes an exposure time control section for adjusting the time of the second pixel row selection based on an average value within a predetermined period of the long time exposure digital pixel value to perform feedback control on the short time exposure time.

14. A solid-state image capturing apparatus according to claim 3, wherein:

the row selection section selects each pixel row four times within a period that corresponds to one frame;

at the time of the first pixel row selection, a signal charge, which is obtained by exposure, of each pixel of the selected pixel row is disposed of;

at the time of the second pixel row selection, a signal charge, which is obtained by exposure in each pixel of the selected pixel row during a period from the time of the first pixel row selection till the time of the second pixel row selection, is read out to a corresponding column signal line;

at the time of the third pixel row selection, a signal charge, which is obtained by exposure, of each pixel of the selected pixel row is disposed of; and at the time of the fourth pixel row selection, a signal charge, which is obtained by exposure in each pixel of the selected pixel row during a period from the time of the third pixel row selection till the time of the fourth pixel row selection, is read out to a corresponding column signal line.

15. A solid-state image capturing apparatus according to claim 14, wherein the control section includes an exposure time control section for adjusting the time of the first pixel row selection based on an average value within a predetermined period of the long time exposure digital pixel value to perform feedback control on the long time exposure time as well as for adjusting the time of the third pixel row selection based on an average value within a predetermined period of the short time exposure digital pixel value to perform feedback control on the short time exposure time.

16. A solid-state image capturing apparatus according to claim 1 wherein:

the long time exposure analog pixel signal is substantially an analog pixel signal obtained from a signal charge accumulated in the pixel during one frame period; and the short time exposure analog pixel signal is substantially an analog pixel signal obtained from a signal charge accumulated in the pixel during one horizontal period.

17. A solid-state image capturing apparatus according to claim 1, wherein:
the first AD conversion circuit includes a first CDS circuit provided prior to each AD converter of the first AD conversion circuit, for sampling a reset signal read out to the column signal line as an analog pixel signal obtained at a dark time, and a data signal output to the column signal line as a long time exposure analog pixel signal to output a first difference analog pixel signal of the reset signal and the data signal; and
the second AD conversion circuit includes a second CDS circuit provided prior to each AD converter of the second AD conversion circuit, for sampling a reset signal read out to the column signal line as an analog pixel signal obtained at a dark time, and a data signal output to the column signal line as a short time exposure analog pixel signal to output a second difference analog pixel signal of the reset signal and the data signal.

18. A solid-state image capturing apparatus according to claim 17,
wherein each AD converter constituting the first AD conversion circuit includes:
a first comparator for comparing the first difference analog pixel signal of a constant level outputted from the first CDS circuit prior to the AD converter, with a first ramp waveform signal to output a first timing signal when the signal level of the first ramp waveform signal exceeds the signal level of the first difference analog pixel signal; and
a first latch circuit for latching a first count value, which corresponds to the signal level of the first difference analog pixel signal, when the first timing signal is outputted, and
wherein each AD converter constituting the second AD conversion circuit includes:
a second comparator for comparing the second difference analog pixel signal of a constant level outputted from the second CDS circuit prior to the AD converter, with a second ramp waveform signal to output a second timing signal when the signal level of the second ramp waveform signal exceeds the signal level of the second difference analog pixel signal; and
a second latch circuit for latching a second count value, which corresponds to the signal level of the second difference analog pixel signal, when the second timing signal is outputted.

19. A solid-state image capturing apparatus according to claim 18,
wherein the signal processing circuit includes:
a first horizontal shift register for outputting a timing pulse signal to the first AD conversion circuit such that the long time exposure digital pixel value of each pixel is successively outputted, the long time exposure digital pixel value being obtained in an AD converter corresponding to each column signal line of the first AD conversion circuit; and
a second horizontal shift register for outputting a timing pulse signal to the second AD conversion circuit such that the short time exposure digital pixel value of each pixel is successively outputted, the short time exposure digital pixel value being obtained in an AD converter corresponding to each column signal line of the second AD conversion circuit,
wherein the first latch circuit includes:
a first initial stage latch section for latching the first count value, which corresponds to the signal level of the first difference analog pixel signal, as the long time exposure digital pixel value based on the first timing signal from the first comparator; and
a first subsequent stage latch section for maintaining the latch output of the first initial stage latch section and outputting the latch output of the first initial stage latch section by a timing pulse from the first horizontal shift register,
wherein the second latch circuit includes:
a second initial stage latch section for latching the second count value, which corresponds to the signal level of the second difference analog pixel signal, as the short time exposure digital pixel value based on the second timing signal from the second comparator; and
a second subsequent stage latch section for maintaining the latch output of the second initial stage latch section and outputting the latch output of the second initial stage latch section by a timing pulse from the second horizontal shift register.

20. A solid-state image capturing apparatus according to claim 18, wherein a process in which the first AD conversion circuit performs an AD conversion on the first difference analog pixel signal is the same as a process in which the second AD conversion circuit performs an AD conversion on the second difference analog pixel signal.

21. A solid-state image capturing apparatus according to claim 20,
wherein the signal processing circuit includes a control section for controlling the first and second AD conversion circuits, and
wherein the control section includes:
a first lamp waveform generating section for outputting the first lamp waveform signal to a plurality of AD converters provided for each column signal line of the first AD conversion circuit;
a second lamp waveform generating section for outputting the second lamp waveform signal to a plurality of AD converters provided for each column signal line of the second AD conversion circuit; and
a counter circuit for supplying the count value to the plurality of AD converters.

22. A solid-state image capturing apparatus according to claim 18, wherein a process in which the first AD conversion circuit performs an AD conversion on the first difference analog pixel signal is different from a process in which the second AD conversion circuit performs an AD conversion on the second difference analog pixel signal.

23. A solid-state image capturing apparatus according to claim 22,
wherein the signal processing circuit includes a control section for controlling the first and second AD conversion circuits, and
wherein the control section includes:
a first lamp waveform generating section for outputting the first lamp waveform signal to a plurality of AD converters provided for each column signal line of the first AD conversion circuit;
a second lamp waveform generating section for outputting the second lamp waveform signal to a plurality of AD converters provided for each column signal line of the second AD conversion circuit, the second lamp waveform signal having a smaller maximum amplitude value compared to the first lamp waveform signal; and a counter circuit for supplying the count value to the plurality of AD converters.

24. A solid-state image capturing apparatus according to claim 22,
wherein the signal processing circuit includes a control section for controlling the first and second AD conversion circuits,
wherein the control section includes:
a first lamp waveform generating section for outputting the first lamp waveform signal having a fixed waveform to a plurality of AD converters provided for each column signal line of the first AD conversion circuit;
a second lamp waveform generating section for outputting the second lamp waveform signal having a variable waveform to a plurality of AD converters provided for each column signal line of the second AD conversion circuit; and
a counter circuit for supplying the count value to the plurality of AD converters, and
wherein, in the second AD conversion circuit, a dynamic range of an AD conversion in each of the AD converters is adjusted by a waveform of the second lamp waveform signal.

25. A solid-state image capturing apparatus according to claim 24, wherein the control section includes a lamp waveform setting section for setting a maximum amplitude value of a lamp waveform generated in the second lamp waveform generating section based on a setting signal from the outside.

26. A solid-state image capturing apparatus according to claim 24, wherein the control section includes a lamp waveform control section for performing feedback control on a maximum amplitude value of a lamp waveform generated in the second lamp waveform generating section based on an average value within a predetermined period of the short time exposure digital pixel value.

27. A solid-state image capturing apparatus according to claim 22,
wherein the signal processing circuit includes a control section for controlling the first and second AD conversion circuits, and
wherein the control section includes:
a first ramp waveform generating section for outputting the first ramp waveform signal having a variable waveform to a plurality of AD converters provided for each column signal line of the first AD conversion circuit;
a first counter circuit for supplying a first counter value to the plurality of AD converters of the first AD conversion circuit;
a first ramp waveform control section for performing feedback control on a maximum amplitude value of a ramp waveform generated in the first ramp waveform generating section based on an average value within a predetermined period of the long time exposure digital pixel value;
a second ramp waveform generating section for outputting the second ramp waveform signal having a variable waveform to a plurality of AD converters provided for each column signal line of the second AD conversion circuit;
a second counter circuit for supplying a second counter value to the plurality of AD converters of the second AD conversion circuit; and
a second ramp waveform control section for performing feedback control on a maximum amplitude value of a ramp waveform generated in the second ramp waveform generating section based on an average value within a predetermined period of the short time exposure digital pixel value, and
wherein, in the first AD conversion circuit, a dynamic range of an AD conversion in each of the AD converters is adjusted by a waveform of the first ramp waveform signal, and in the second AD conversion circuit, a dynamic range of an AD conversion in each of the AD converters is adjusted by a waveform of the second ramp waveform signal.

28. A solid-state image capturing apparatus according to claim 1, wherein the signal processing circuit includes:
a first horizontal shift register for outputting a timing pulse signal to the first AD conversion circuit such that the long time exposure digital pixel value of each pixel is successively outputted, the long time exposure digital pixel value being obtained in an AD converter corresponding to each column signal line of the first AD conversion circuit; and
a second horizontal shift register for outputting a timing pulse signal to the second AD conversion circuit such that the short time exposure digital pixel value of each pixel is successively outputted, the short time exposure digital pixel value being obtained in an AD converter corresponding to each column signal line of the second AD conversion circuit.

29. A solid-state image capturing apparatus according to claim 28, wherein the signal processing circuit includes a logic circuit for combining, for each corresponding pixel, the long time exposure digital pixel value of each pixel, which is successively outputted from the first AD conversion circuit, and the short time exposure digital pixel value of each pixel, which is successively outputted from the second AD conversion circuit.

30. A solid-state image capturing apparatus according to claim 1, wherein the signal processing circuit includes a control section for controlling the first AD conversion circuit such that the longtime exposure analog pixel signal of each pixel of the selected pixel row is simultaneously converted into a long time exposure digital pixel value as well as for controlling the second AD conversion circuit such that the short time exposure analog pixel signal of each pixel of the selected pixel row is simultaneously converted into a short time exposure digital pixel value.

31. An electronic information device having an image capturing section for capturing an image of a subject, wherein the image capturing section is the solid-state image capturing apparatus according to claim 1.

32. A method for driving a solid-state image capturing apparatus, the solid-state image capturing apparatus including: a pixel area in which pixels for generating a signal charge by a photoelectric conversion on an incident light are arranged in a two dimensional matrix; a row selection section for selecting each pixel row of the pixel area; and a plurality of column signal lines, to which an analog pixel signal from each pixel of a pixel row selected by the row selection section is read out, the column signal lines being provided for each pixel column in the pixel area, the method driving the solid-state image capturing apparatus such that a pixel row is successively selected by the row selection section and a pixel value of each pixel of the selected pixel row is successively outputted,
wherein the each pixel row is selected twice or more within one frame period by the row selection section, and
wherein an analog signal of each pixel, which is read out from each pixel of the selected pixel row to a corresponding column signal line, is simultaneously converted into a digital pixel value;

wherein each pixel row is selected twice within one frame period by the row selection section such that a long time exposure analog pixel signal, which corresponds to a signal charge obtained by long time exposure, is read out as the analog pixel signal from each pixel row to a column signal line corresponding to each pixel during a first horizontal blanking period, and that a short time exposure analog pixel signal, which corresponds to a signal charge obtained by short time exposure, is read out as the analog pixel signal from each pixel row to a column signal line corresponding to each pixel during a second horizontal blanking period;

the long time exposure analog pixel signal from each pixel of a selected pixel row is simultaneously AD converted, during a remaining signal processing time in the frame period, into a long time exposure digital pixel value by a first AD conversion circuit; and the short time exposure analog pixel signal from each pixel of a selected pixel row is simultaneously AD converted, during a remaining signal processing time in the frame period in parallel with the AD conversion on the long time exposure analog pixel signal in the first AD conversion circuit, into a short time exposure digital pixel value by a second AD conversion circuit.

* * * * *